US010890966B2

(12) United States Patent
Croxford

(10) Patent No.: US 10,890,966 B2
(45) Date of Patent: Jan. 12, 2021

(54) GRAPHICS PROCESSING SYSTEMS

(71) Applicant: ARM Limited, Cambridge (GB)

(72) Inventor: Daren Croxford, Swaffham Prior (GB)

(73) Assignee: Arm Limited, Cambridge (GB)

( * ) Notice: Subject to any disclaimer, the term of this patent is extended or adjusted under 35 U.S.C. 154(b) by 10 days.

(21) Appl. No.: 15/661,213

(22) Filed: Jul. 27, 2017

(65) Prior Publication Data

US 2019/0033961 A1    Jan. 31, 2019

(51) Int. Cl.

| G06F 3/01 | (2006.01) |
|---|---|
| G06T 5/00 | (2006.01) |
| A63F 13/53 | (2014.01) |
| G06T 1/20 | (2006.01) |
| G06T 3/20 | (2006.01) |
| G06T 7/30 | (2017.01) |
| G06T 7/246 | (2017.01) |
| A63F 13/25 | (2014.01) |
| G02B 27/01 | (2006.01) |
| A63F 13/211 | (2014.01) |
| A63F 13/212 | (2014.01) |
| A63F 13/5255 | (2014.01) |

(52) U.S. Cl.
CPC ............ *G06F 3/012* (2013.01); *A63F 13/211* (2014.09); *A63F 13/212* (2014.09); *A63F 13/25* (2014.09); *A63F 13/5255* (2014.09); *A63F 13/53* (2014.09); *G02B 27/017* (2013.01); *G06T 1/20* (2013.01); *G06T 3/20* (2013.01); *G06T 7/248* (2017.01); *G06T 7/30* (2017.01); *G02B 2027/014* (2013.01)

(58) Field of Classification Search
CPC ................................. G06F 3/012; G06T 5/009
See application file for complete search history.

(56) References Cited

U.S. PATENT DOCUMENTS

| 2002/0145611 A1 | 10/2002 | Dyet et al. |
| 2008/0218467 A1 | 9/2008 | Huang |
| 2012/0317661 A1* | 12/2012 | Yamaguchi ........... H04L 9/0825 726/32 |

(Continued)

FOREIGN PATENT DOCUMENTS

| GB | 2525388 A | 10/2015 |
| WO | WO2012/040263 | 3/2012 |

OTHER PUBLICATIONS

European Search Report dated Nov. 14, 2014, in GB Patent Application No. GB1406976.9.

(Continued)

*Primary Examiner* — Yi Yang
(74) *Attorney, Agent, or Firm* — Vierra Magen Marcus LLP

(57) ABSTRACT

When generating an extrapolated frame by extrapolating object motion from a rendered frame in a graphics processing system, regions of a first frame are compared 90 with corresponding regions of another frame. If the regions are determined to be different, it is determined whether or not regions of the first frame contain objects that need to be extrapolated to generate the extrapolated frame, but if the regions are determined to be similar, it is assumed that the regions of the first frame do not contain any objects that need to be extrapolated to generate the extrapolated frame.

18 Claims, 14 Drawing Sheets

(56) References Cited

U.S. PATENT DOCUMENTS

| | | | | |
|---|---|---|---|---|
| 2013/0198794 | A1* | 8/2013 | Dharmapurikar | H04L 65/80 |
| | | | | 725/118 |
| 2014/0152891 | A1* | 6/2014 | Gilbert | G06K 9/00744 |
| | | | | 348/441 |
| 2015/0287174 | A1* | 10/2015 | St. Romain, II | G06T 5/008 |
| | | | | 382/169 |
| 2015/0310791 | A1 | 10/2015 | Croxford et al. | |
| 2016/0098161 | A1* | 4/2016 | Baack | G06F 3/0482 |
| | | | | 715/764 |
| 2016/0148335 | A1* | 5/2016 | Huang | G06T 1/20 |
| | | | | 345/501 |
| 2017/0039676 | A1* | 2/2017 | Chen | G06T 1/20 |

OTHER PUBLICATIONS

Ruggiero et al., "DBS4video: Dynamic Luminance Backlight Scaling based on Multi-Histogram Frame Characterization for Video Streaming Application," University of Bologna, DEIS via Risorgimento 2, 40133 Bologna, Italy.

Chang et al., "DLS: Dynamic Backlight Luminance Scaling of Liquid Crystal Display,", IEEE Transactions on Very Large Scale Integration (Vlsi) Systems, vol. 12, No. 8, Aug. 2004.

Zhang et al., "An Adaptive Algorithm of Local Dimming for Liquid Crystal Displays," Telkomnika, vol. 10, No. 7, Nov. 2012, pp. 1862~1868, e-ISSN: 2087-278X.

Greef, et al., "Adaptive dimming and Adaptive Boosting Backlight Technologies for LCD-TV systems," Nov. 14, 2007, EE Times, http://www.eetimes.com/document.asp?doc_id=1273777.

Office Action dated Jan. 17, 2017, in U.S. Appl. No. 14/682,321.

Amendment dated Jul. 17, 2017, in U.S. Appl. No. 14/682,321.

Notice of Allowance dated Aug. 23, 2017, in U.S. Appl. No. 14/682,321.

Beeler et al., "Asynchronous Spacewarp", Oculus Developer Blog, Nov. 10, 2016, https://developer.oculus.com/blog/asynchronous-spacewarp/.

Lagendijk et al., "Motion Compensated Frame Rate Conversion of Motion Pictures", IEEE, Mar. 1992.

* cited by examiner

GRAPHICS PROCESSING SYSTEMS

BACKGROUND

The technology described herein relates to graphics processing systems, and in particular to graphics processing systems that provide images for display for virtual reality (VR) and/or augmented reality (AR) display systems.

FIG. 1 shows an exemplary system on chip (SoC) graphics processing system 10 that comprises a host processor comprising a central processing unit (CPU) 1, a graphics processing unit (GPU) 2, a display controller 4, and a memory controller 6. The exemplary graphics processing system 10 may also comprise a video engine 3. As shown in FIG. 1, these units communicate via an interconnect 5 and have access to off-chip memory 7. In this system, the graphics processing unit (GPU) 2 will render frames (images) to be displayed, and the display controller 4 will then provide the frames to a display panel 8 for display.

In use of this system, an application such as a game, executing on the host processor (CPU) 1 will, for example, require the display of frames on the display 8. To do this, the application will submit appropriate commands and data to a driver for the graphics processing unit (GPU) 2 that is executing on the CPU 1. The driver will then generate appropriate commands and data to cause the graphics processing unit (GPU) 2 to render appropriate frames for display and to store those frames in appropriate frame buffers, e.g. in the main memory 7. The display controller 4 will then read those frames into a buffer for the display from where they are then read out and displayed on the display panel of the display 8.

The graphics processing system 10 will be configured to provide frames for display, and the graphics processing unit (GPU) 2 will correspondingly be configured to render frames, at an appropriate rate, such as 30 frames per second.

An example of a use of a graphics processing system such as that illustrated in FIG. 1 is to provide a virtual reality (VR) or augmented reality (AR) head mounted display (HMD) system. In this case, the display 8 will be a head-mounted display of some kind.

In a head mounted display operation, appropriate frames (images) to be displayed to each eye will be rendered by the graphics processing unit (GPU) 2 in response to appropriate commands and data from the application, such as a game, (e.g. executing on the CPU 1) that requires the display.

In such arrangements, the system will also operate to track the movement of the head/gaze of the user (so-called head pose (orientation) tracking). This head orientation (pose) data is then used to determine how the images should actually be displayed to the user for their current head position (view direction), and the images (frames) are rendered accordingly (for example by setting the camera (viewpoint) orientation based on the head orientation data), so that an appropriate image (frame) based on the user's current direction of view can be displayed.

While it would be possible simply to determine the head orientation (pose) at the start of the graphics processing unit (GPU) 2 rendering a frame to be displayed in a virtual reality (VR) or augmented reality (AR) system, and then to update the display 8 with the frame once it has been rendered, because of latencies in the rendering process, it can be the case that the user's head orientation (pose) has changed between the sensing of the head orientation (pose) at the beginning of the rendering of the frame and the time when the frame is actually displayed (scanned out to the display 8). Moreover, it is often desirable to be able to provide frames for display in a virtual reality (VR) or augmented reality (AR) system at a rate that is faster than the graphics processing unit (GPU) 2 may be able to render frames at.

To allow for this, a process known as "timewarp" has been proposed for head mounted display systems. In this process, an "application" frame is first rendered by the graphics processing unit (GPU) 2 based on the head orientation (pose) data sensed at the beginning of the graphics processing unit (GPU) 2 rendering the application frame, but then before an image is actually displayed on the display 8, further head orientation (pose) data is sensed, and that updated head orientation (pose) sensor data is used transform the graphics processing unit (GPU) 2 rendered application frame to generate an "updated" version of the application frame that takes account of the updated head orientation (pose) data. The so-"timewarped" updated version of the application frame is then displayed on the display 8.

The processing required to "timewarp" a graphics processing unit (GPU) 2 rendered application frame can typically be performed in a much shorter time than the time required for the graphics processing unit (GPU) 2 to render a frame. Thus by performing timewarp processing, the time between head orientation (pose) data being sensed, and the image displayed on the display 8 being updated using the sensed head orientation (pose) data, can be reduced as compared to the graphics processing unit (GPU) 2 directly rendering each image to be displayed on the display 8 without timewarp processing. The effect of this is that, by using timewarp processing, the image displayed on the display 8 can more closely match the user's latest head orientation (pose), resulting in a more realistic virtual reality (VR) or augmented reality (AR) experience, for example.

Similarly, timewarp processing can be performed at a faster rate, such as 90 or 120 frames per second, than the graphics processing unit (GPU) 2 may be able to render frames at, such as 30 frames per second. Thus, timewarp processing can be used to provide frames for display that have been updated based on a sensed head orientation (pose) at a faster rate than would otherwise be possible without the use of timewarp processing. This can help to reduce "judder" artefacts and provide a smoother virtual reality (VR) or augmented reality (AR) experience, for example.

FIGS. 2, 3 and 4 illustrate the "timewarp" process in more detail.

FIG. 2 shows the display of an exemplary frame 20 when the viewer is looking straight ahead, and the required "timewarp" projection of that frame 21 when the viewing angle of the user changes. It can be seen from FIG. 2 that for the frame 21, a modified version of the frame 20 must be displayed.

FIG. 3 correspondingly shows the timewarp rendering 31 of application frames 30 to provide the "timewarped" frames 32 for display. As shown in FIG. 3, a given application frame 30 that has been rendered may be subject to two (or more) timewarp processes 31 for the purpose of displaying the appropriate timewarped version 32 of that application frame 30 at successive intervals whilst waiting for a new application frame to be rendered. The timewarp processing 31 can be performed in parallel with (using a different thread to) the rendering of application frames 30 (i.e. asynchronously), which is referred to as "asynchronous timewarp" (ATW) processing.

FIG. 3 also shows the regular sampling 33 of the head orientation (pose) data that is used to determine the appropriate "timewarp" modification that should be applied to an application frame 30 for displaying the frame appropriately to the user based on their head orientation (pose).

FIG. 4 shows a schematic illustration of an exemplary rendered application frame 40, together with four respective timewarped frames 41A-D generated for display by timewarping application frame 40. So as to ensure that graphics processing unit (GPU) 2 rendered application frame data is available to be "timewarped" for a range of possible head movements, application frames are typically rendered by the graphics processing unit (GPU) 2 based on a field of view that is wider than the field of view of the timewarped frames that are actually displayed to the user. The field of view of an application frame may be based on, for example, a permitted or expected (maximum) amount of head motion (rotation) in the time period that the application frame is supposed to be valid for. Then, when the application frame is to be displayed, the timewarp process will be used to effectively render an appropriate window ("letterbox") taken from the wider field of view of the application frame. Thus in the schematic example of FIG. 4, application frame 40 is provided by rendering the scene based on a 16×8 square field of view, but timewarped frames 41A-D are provided for display with only a 5×4 square field of view taken from the wider field of view.

Each timewarped frame will also be transformed (timewarped), e.g. as described above, based on more recent head orientation (pose) information to provide the actual image that is displayed to the use. Thus, as shown in the example of FIG. 4, when a change in head orientation (pose) is detected, application frame 40 is transformed such that object 42 appears at an appropriately shifted position in timewarped frames 41B-D, as compared to when no change in head orientation (pose) is detected (41A). Thus, as shown in FIG. 4, when a head movement to the right is detected, object 42 appears shifted to the left (41B); when a larger head movement to the right is detected, object 42 appears shifted farther to the left (41C); and when a head movement to the left is detected, object 42 appears shifted to the right (41D) as compared to when no change in head orientation (pose) is detected (41A).

Thus, in timewarp processing, an application frame is first rendered based on a first head orientation (pose) sensed at the beginning of rendering the application frame, and thus essentially represents a static "snapshot" of the scene being rendered as it should appear to a user at the point in time that the first head orientation (pose) was sensed. Timewarp processing can then be used to update (transform) the static "snapshot" application frame based on one or more second head orientations (poses) sensed at one or more respective later points in time, after the application frame has been rendered, to provide a series of one or more successive timewarped frames that each represent an updated view of the scene at a respective later point in time.

It has been recognised, however, that while such timewarp processing takes account of changes to head orientation (pose) during the time period between the point in time at which the first head orientation (pose) is sensed, and the point in time at which a respective second head orientation (pose) is sensed, it does not account for, and so timewarped frames do not show, any changes due to the motion of objects within the scene during that same time period. This means that the timewarp processing of a rendered application frame that represents a dynamic scene, i.e. a scene that includes moving objects, can introduce distortions in what is displayed to a user.

For example, in the case of a dynamic scene that includes an object that is moving with respect to background objects in the scene, the position of the moving object relative to the background objects should appear to change in time due to the motion of the object. Thus, in the case of a timewarped frame that represents an "updated" version of an application frame at a later point in time, such a moving object should appear in the timewarped frame at a position relative to background objects that is different to that shown in the application frame. Moreover, in the case of a series of successive timewarped frames that represent successive "updated" versions of a single application frame at successive later points in time, the moving object should appear at different relative positions in each of the successive timewarped frames.

However, since timewarp processing does not account for any such object motion, each timewarped frame generated from an application frame will show such a moving object at the same position relative to background objects that it is shown in the application frame. Thus a moving object may appear at an incorrect (relative) position in a timewarped frame, and, moreover, may appear static in successive timewarped frames generated from the same application frame.

To account for object motion when performing timewarp processing, a process known as "spacewarp" processing has been proposed. This process attempts to take account of any motion of objects when a timewarped frame is to be generated by timewarping an application frame based on a head orientation (pose) sensed at a later point in time, by extrapolating moving objects shown in the application frame to expected e.g. positions at that later point in time, with the timewarp processing then being performed on the basis of the extrapolated objects. The so-"timewarped" and "spacewarped" updated version of the application frame is then displayed on the display 8.

The Applicants believe that there remains scope for improvements to graphics processing systems, and in particular to graphics processing systems that provide "spacewarped" images for display for virtual reality (VR) and/or augmented reality (AR) display systems.

BRIEF DESCRIPTION OF THE DRAWINGS

Various embodiments of the technology described herein will now be described by way of example only and with reference to the accompanying drawings, in which.

Like reference numerals are used for like components where appropriate in the drawings.

DETAILED DESCRIPTION

Figure 1:
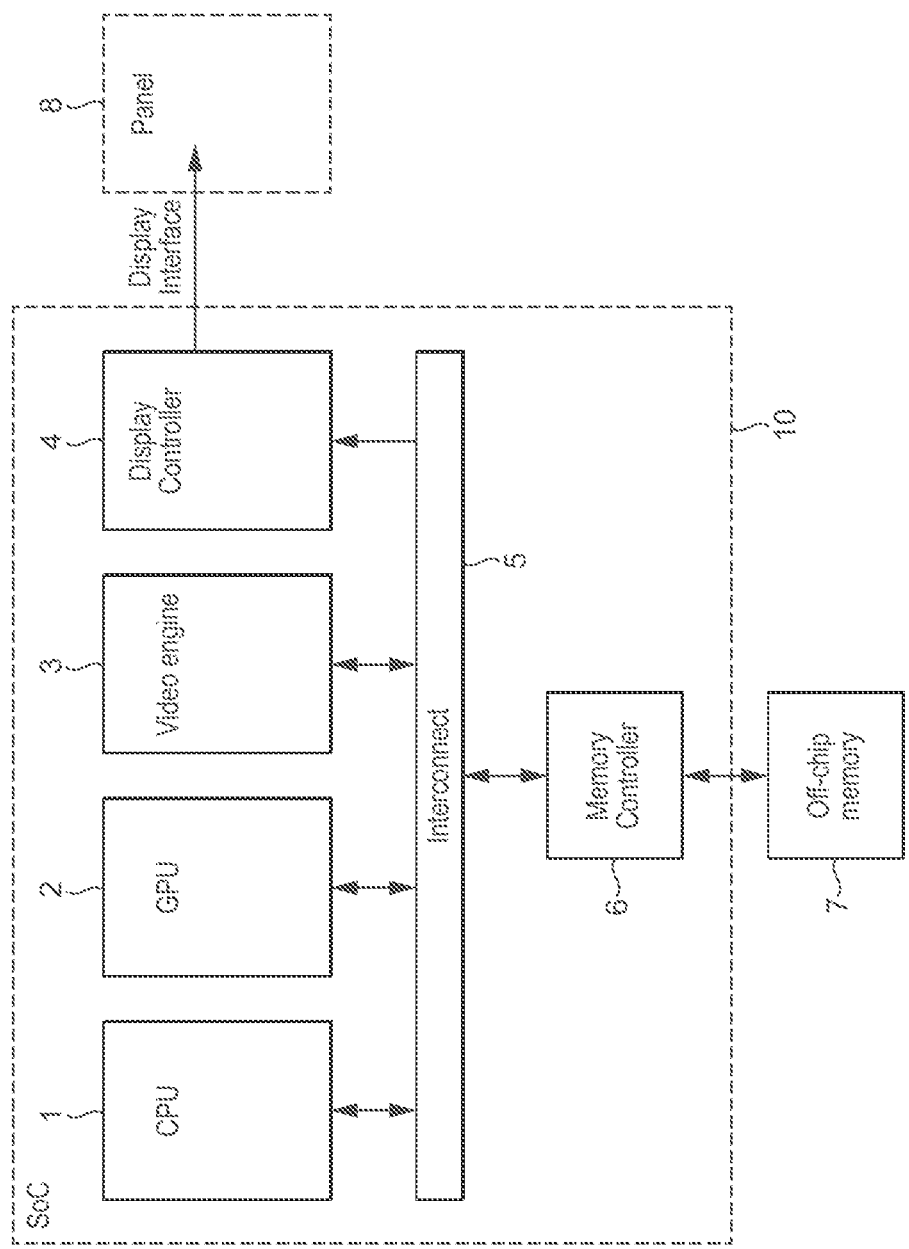
FIG. 1 shows an exemplary graphics processing system.
Figure 2:
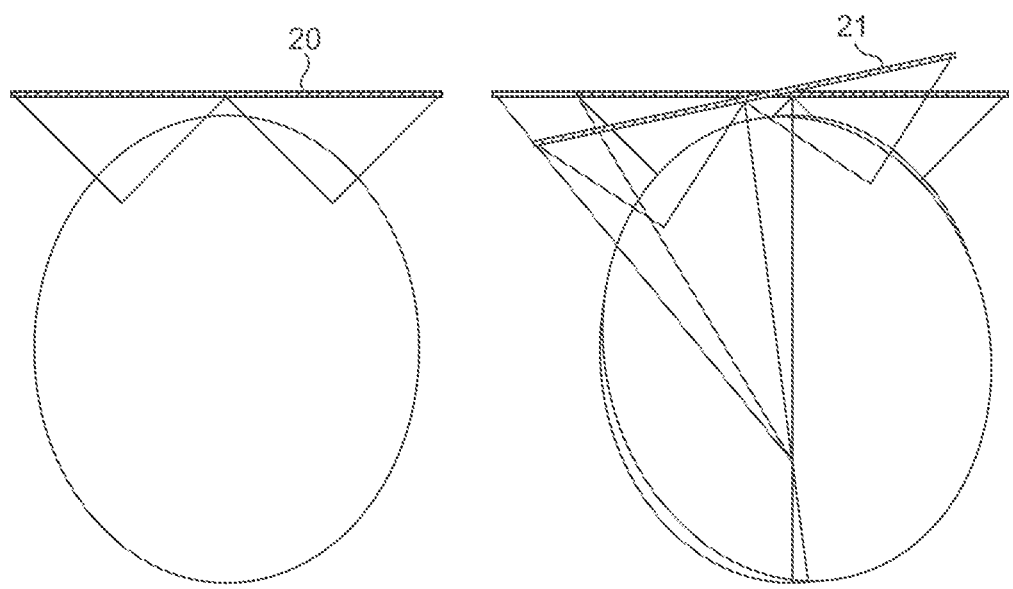
FIG. 2 illustrates the process of "timewarp" processing in a head mounted display system.
Figure 3:
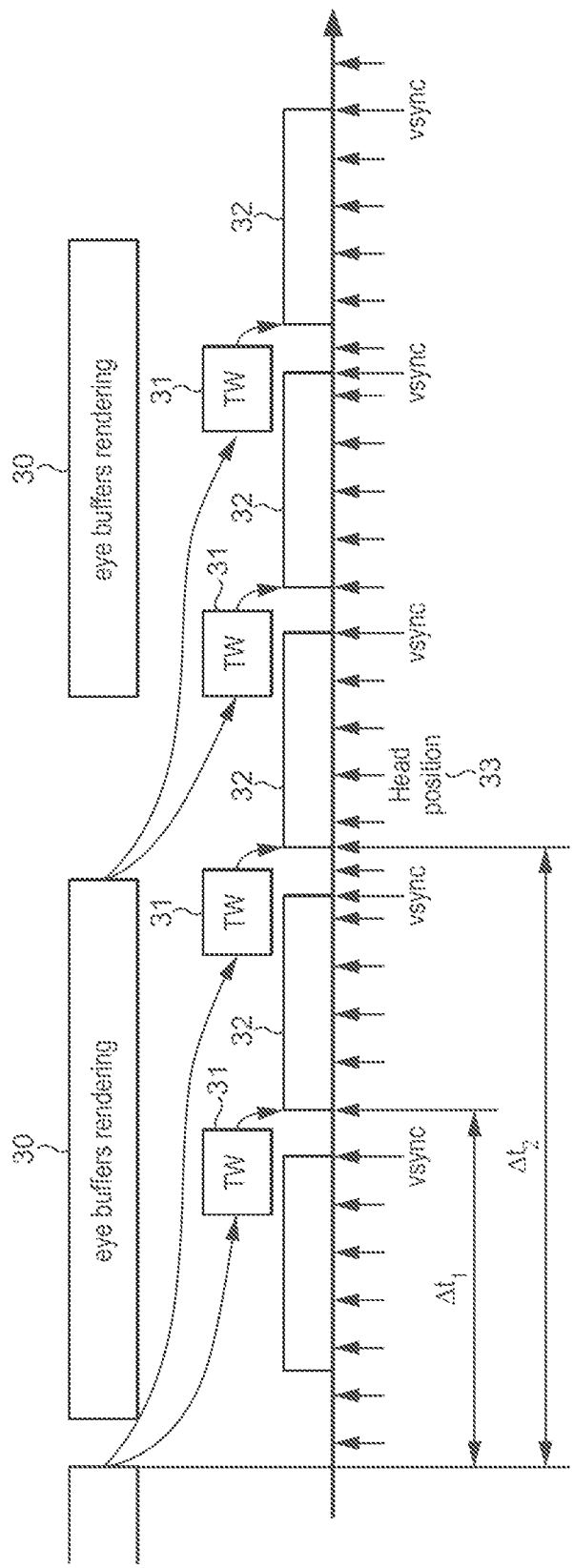
FIG. 3 shows another illustration of the process of "timewarp" processing in a head mounted display system.

A first embodiment of the technology described herein comprises a method of operating a graphics processing system that renders a sequence of frames each representing a view of a scene of one or more objects, and generates extrapolated frames by extrapolating object motion from rendered frames, the method comprising:

when an extrapolated frame is to be generated by extrapolating object motion:
  for at least one region of a set of regions that a first frame has been divided into:
    comparing the region of the first frame with a corresponding region of another frame;
    determining whether the region of the first frame is dissimilar to the corresponding region of the another frame using the comparison; and
    when it is determined that the region of the first frame is dissimilar to the corresponding region of the another frame, determining whether the region of the first frame contains one or more objects, the motion of which needs to be extrapolated to generate the extrapolated frame.

A second embodiment of the technology described herein comprises a graphics processing system comprising:

processing circuitry configured to render a sequence of frames each representing a view of a scene of one or more objects, and generate extrapolated frames by extrapolating object motion from rendered frames; and
processing circuitry configured to, for an extrapolated frame that is to be generated by extrapolating object motion:
  for at least one region of a set of regions that a first frame has been divided into:
    compare the region of the first frame with a corresponding region of another frame;
    determine whether the region of the first frame is dissimilar to the corresponding region of the another frame using the comparison; and
    when it is determined that the region of the first frame is dissimilar to the corresponding region of the another frame, determine whether the region of the first frame contains one or more objects, the motion of which needs to be extrapolated to generate the extrapolated frame.

The technology described herein relates to a graphics processing system that generates an extrapolated frame by extrapolating objects based on their motion (e.g. translation and/or rotation) from a previously rendered frame, e.g. and in an embodiment, such that moving objects shown in the previously rendered frame are shown appropriately translated, rotated and/or scaled in the extrapolated frame based on their motion.

In the technology described herein, when an extrapolated (e.g. "spacewarped") frame is to be generated based on object motion from a rendered (e.g. "application") frame, a region (and in an embodiment plural regions) of a first (e.g. "application") frame are compared with corresponding regions of another (e.g. "application") frame, to determine whether the respective frame regions are dissimilar to each other (or not).

If the respective frame regions are determined to be dissimilar (e.g. different) to each other, then it is assumed that the compared region of the first frame could include one or more moving objects, the motion of which should be extrapolated to the extrapolated frame to show the one or more moving objects appropriately in the extrapolated frame, e.g. in their expected positions. Thus, in this case, it is determined whether (or not) the region of the first frame contains one or more objects, the motion of which needs to be extrapolated to generate the extrapolated frame, e.g. and in an embodiment, by subjecting the frame region to an appropriate motion estimation/object detection operation, e.g. as will be described in more detail below. Then, when it is determined that the frame region contains one or more such objects to be extrapolated, the motion of those objects can be (and in an embodiment is) extrapolated to generate the extrapolated frame.

If, on the other hand, the respective frame regions are not (are other than) determined to be dissimilar to (e.g. if they are determined to be similar to, or the same as) each other, then it is assumed that the compared region of the first frame does not include any moving objects that need to be extrapolated to the extrapolated frame, e.g. because the frame region includes (only) objects that are not (significantly) moving (i.e. that are (substantially) static). In this case therefore, determining whether (or not) the frame region contains one or moving objects to be extrapolated (by subjecting the frame region to a motion estimation/object detection operation) can be (and in an embodiment is) omitted. Moreover, in this case, extrapolating the motion of any objects within the frame region to the extrapolated frame to generate the extrapolated frame can also be (and in an embodiment is) omitted.

Thus, in an embodiment of the technology described herein, a region (or regions) of a first frame that does not contain any objects that need to be extrapolated to generate an extrapolated frame can be (and in an embodiment is) determined by determining that that region (or regions) is similar to a corresponding region of another frame, and thus extrapolating objects within that so-determined region (or regions) when generating the extrapolated frame can be (and in an embodiment is) omitted.

This means, for example, that the processing that would otherwise be required to extrapolate object positions to, and generate extrapolated data for, an extrapolated frame based on object motion from a previously rendered (e.g. "application") frame, can be reduced or avoided for a region or regions of the rendered frame that can be assumed, based on a comparison with corresponding regions of another earlier rendered frame, not to contain moving objects that need to be extrapolated to generate the extrapolated frame. Thus, the processing required to generate an extrapolated frame can be reduced. This can provide significant savings in terms of memory bandwidth, processing resources and power, etc., when performing so-called "spacewarp" processing.

It will be appreciated, therefore, that the technology described herein provides an improved graphics processing system, and in particular an improved graphics processing system that provides "spacewarped" images for display for virtual reality (VR) and/or augmented reality (AR) display systems.

The first frame may be any suitable and desired frame (image) that represents a view of a scene. In an embodiment the first frame is a first rendered frame, in an embodiment from a sequence of rendered frames, e.g. that are being rendered to display a sequence of images to a viewer.

Similarly, the another frame that the regions of the first (rendered) frame are compared with can be any suitable and desired frame. In an embodiment, the another frame is a second, rendered frame that has been rendered earlier (in the sequence of rendered frames) than the first rendered frame that is currently being considered (that it is being compared with). In this case, the second, earlier rendered frame can be any suitable and desired frame (image) that is rendered at an earlier time than the first rendered frame.

The another (e.g. second, earlier rendered) frame in an embodiment represents a view of the same scene that the first (rendered) frame represents a view of, but at an earlier point in time (and thus is in an embodiment an earlier frame in a (the) sequence of (rendered) frames that is being generated).

Thus, in an embodiment, the another (e.g. second, earlier rendered) frame and the first (rendered) frame are (in an embodiment consecutive) frames in a sequence of successive (rendered) frames (representing successive views of a scene). The another (e.g. second, earlier rendered) frame may be the (rendered) frame that immediately precedes the first (rendered) frame in the sequence of (rendered) frames, or an earlier (rendered) frame in the sequence of (rendered) frames.

In an embodiment, the or each rendered frame comprises a frame generated for display, but which is to be processed before it is displayed, to generate a processed version of the rendered frame that is then displayed. For example, and in an embodiment, the or each rendered frame comprises a frame generated for display (for an application, such as a game), but which is to be processed by subjecting it to a transformation so that a processed (transformed) version of the rendered frame is displayed based on a determined view (head) orientation (pose) after it has been initially rendered (e.g., and in an embodiment, the or each rendered frame is an "application" frame which is to be subjected to "timewarp" processing).

As will be discussed further below, the or each rendered frame should also or instead be processed by subjecting it to an extrapolation operation based on object motion so that a processed (extrapolated) version of the or each rendered frame is in an embodiment displayed (e.g., and in an embodiment, the or each rendered frame is an "application" frame which is to be subjected to "spacewarp" processing).

The or each rendered frame can be any suitable and desired size. However, in an embodiment, the or each rendered (e.g. "application") frame is rendered based on a field of view that is wider (in an embodiment in two dimensions) than the field of view that a (and each) processed (e.g. "timewarped") version of the rendered frame is to be displayed based on. For example, and in an embodiment, where a processed (e.g. "timewarped") version of a rendered (e.g. "application") frame is to be displayed based on a (different) determined view (head) orientation (pose), then the field of view of the rendered (e.g. "application") frame may be based on a permitted or expected (maximum) amount of camera (head) movement (rotation) in the time period that the rendered frame is supposed to be used for processing ("timewarping").

In another embodiment, however, the first frame is a first processed frame that represents a processed version of a previously rendered frame, and the another frame is a second (in an embodiment earlier) processed frame that represents a processed version of a (in an embodiment earlier) previously rendered frame.

In this case, the first processed frame and/or the second processed frame can be any suitable and desired processed version of a previously rendered frame. For example, and in an embodiment, the first processed frame and/or the second processed frame is a transformed, extrapolated and/or output (displayed) version of a previously rendered frame (e.g. and in an embodiment, a "timewarped" and/or "spacewarped" version of a previously rendered "application" frame).

The first processed frame and the second processed frame could be processed versions of the same previously rendered (e.g. "application") frame. However, in an embodiment, the first processed frame is a processed version of a first rendered frame, and the second processed frame is a processed version of a second (earlier) rendered frame. In an embodiment, the first processed frame is a processed version in a series of plural processed versions of a (or the) first rendered frame (generated for display), and the second processed frame is a, in an embodiment corresponding, processed version in a series of plural processed versions of a (or the) second, earlier rendered frame (generated for display). For example, and in an embodiment, the first processed frame is the first processed version in a series of plural processed versions of a (or the) first rendered frame (generated for display), and the second processed frame is the first processed version in a series of plural processed versions of a (or the) second, earlier rendered frame (generated for display).

Thus, in one embodiment of the technology described herein, a (and each) region of a first rendered (e.g. "application") frame is compared with a corresponding region of a second, earlier rendered (e.g. "application") frame. In another embodiment, however, a (and each) region of a first processed (e.g. "timewarped" and/or "spacewarped") frame is compared with a corresponding region of a second (earlier) processed (e.g. "timewarped" and/or "spacewarped") frame.

In this regard, the Applicants have recognised that in the case where the field of view of a processed frame is smaller than the field of view of the rendered frame from which it is generated (such as would typically be the case where the rendered frame is an "application" frame, and the processed frame is a "timewarped"/"spacewarped" version of the "application frame"), then the operation in the manner of the technology described herein may be performed in respect of more of the scene being rendered where the comparison is between rendered frame regions than where it is between processed frame regions. Thus, the comparison of the technology described herein in an embodiment comprises a comparison of a (and each) region of a first rendered frame with a corresponding region of a second, earlier rendered frame.

A (each) (e.g. rendered or processed) frame (a region of which is to be compared) may comprise an array of data elements (sampling positions) (e.g. pixels), for each of which appropriate data (e.g. a set of colour values) is stored.

A (each) frame can be generated as desired. The or each (rendered or processed) frame is in an embodiment generated (rendered or processed) by a graphics processing unit (a graphics processor) of the graphics processing system, but it could also or instead be generated or provided by another component or components of the overall graphics processing system, such as a CPU or a video processor, if desired.

The or each frame may be stored in (written to) memory for subsequent use as desired. For example, the or each frame may be stored in a frame buffer in memory, from where it can then be read for further processing (e.g. as described below) and/or for display by a display controller of the graphics processing system.

The memory where the or each frame is stored may comprise any suitable memory and may be configured in any suitable and desired manner. For example, it may be a memory that is on chip with the graphics processing unit (GPU) or it may be an external memory. In an embodiment it is an external memory, such as a main memory of the graphics processing system. It may be dedicated memory for this purpose or it may be part of a memory that is used for other data as well.

The set of regions that the first (and/or another) frame is divided into may be any suitable set of regions of the frame.

The frame(s) are in an embodiment divided (partitioned) into a set of plural identifiable smaller regions, each representing a part of (some but not all of) the overall frame. The sub-division of the frame(s) can be done as desired, and each region can represent any suitable and desired region (area) of the overall frame.

Each region in an embodiment represents a different part of the overall frame (although the regions could overlap if desired). Each region should represent an appropriate portion (area) of the frame (plurality of data elements within the array).

In an embodiment, a (and the) frame is divided into an array of regularly sized and shaped sub-regions, in an embodiment in the form of rectangular (and in an embodiment square) regions, and the regions of the frames that are compared comprise one or more of these regularly sized and shaped sub-regions. Suitable sub-region sizes would be, e.g., 8×8, 16×8, 16×16, 32×4, 32×8, or 32×32 data elements in the data array. Other arrangements would, of course, be possible.

In an embodiment, each such regularly sized and shaped sub-region corresponds to a "tile", e.g. that a processing stage, e.g. graphics processing unit (GPU), of the graphics processing system produces as its output. Thus, in an embodiment, the first frame is divided into a set of plural "tiles" (that the graphics processing unit (GPU) produces as its output), and each region that is compared with a corresponding region of the another frame comprises one or more tiles of the set of processing tiles (and in an embodiment a (single) processing tile).

The corresponding region of the another frame to which the region of the first frame is compared may comprise any suitable region of the another frame.

The corresponding region of the another frame to which the region of the first frame is compared in an embodiment has the same configuration, e.g. size and/or shape, as the (first) frame region to which it is compared. Accordingly, the corresponding another frame region to which the frame region of the first frame is compared in an embodiment has the same number (and arrangement) of data elements as the frame region to which it is compared.

In one embodiment, the corresponding region of the another frame directly corresponds to the region of the first frame to which it is compared, i.e. the corresponding region of the another frame has the same positioning (of data elements) within the another frame as the positioning of the (data elements of the) region within the first frame.

In another embodiment, however, the corresponding region of the another frame does not directly correspond to the region of the first frame to which it is compared. For example, the corresponding region of the another frame and the region of the first frame may be shifted (translated), rotated and/or scaled relative to each other with respect to the respective frames. Such a shift, rotation and/or scaling may be based, e.g. (and in an embodiment), on a change in view (head) orientation (pose) (e.g. yaw, pitch and/or roll), e.g. due to camera (head) movement (e.g. camera panning).

In this regard, the Applicants have recognised that objects of a scene that appear in a first frame may appear at a shifted position in a next frame due to the effects of camera movement (e.g. panning), and thus that a comparison of directly corresponding regions of such frames may compare different regions of the scene. By comparing regions that are shifted (translated), rotated and/or scaled with respect to each other based on camera movement (e.g. panning), camera movement can be taken into account, such that the same (static) regions of the scene can be compared.

Thus, in an embodiment, where the another frame represents a view of a scene based on a view (head) orientation (pose), and the first frame represents a view of the scene based on a different, changed view (head) orientation (pose), e.g. due to camera movement (e.g. due to a user's head movement (e.g. yaw, pitch and/or roll, etc.)), then the region of the another frame that is compared with the region of the first frame is in an embodiment shifted (translated) (horizontally and/or vertically), rotated and/or scaled with respect to the region of the first frame. The shift (translation), rotation and/or scaling is in an embodiment based on (a determined) view (head) orientation (pose) change (panning) between the first (e.g. rendered or processed) frame and the another (e.g. second, earlier rendered or processed) frame.

Thus, in an embodiment, the region of the another frame that is compared with the region of the first frame is a region of the another frame that is displaced, rotated and/or scaled within the frame relative to the region of the first frame, such that the region of the another frame in an embodiment represents a view of the same (static) region of the scene that the region of the first frame represents a view of.

Correspondingly, in one embodiment, the division of the another frame into a set of regions is performed in the same manner that the first frame is divided into a set of regions (e.g. as described above). Thus, in an embodiment, the set of regions that the first frame is divided into has the same configuration, e.g. number, size, shape and/or position of regions, as the set of regions that the another frame is divided into.

In another embodiment, however, the division of the first frame is performed in a different manner to the another frame, such that the set of regions that the first frame is divided into may have a different configuration, e.g. number, size, shape and/or position of regions, to the set of regions that the another frame is divided into. For example, in an embodiment, the division of a frame into a respective set of regions is performed in dependence on a change in view (head) orientation (pose), e.g. due to camera movement (e.g. panning) (e.g. as described above).

It will be appreciated that where the first frame and the another frame are rendered frames of a series of (rendered or processed) frames, then some or all (and in an embodiment all) of the other frames in the series of frames may each be divided into a respective set of plural regions, e.g. (and in an embodiment) as described above. Thus, in an embodiment, each (rendered or processed) frame in a series of (rendered or processed) frames is divided into a respective set of plural regions, e.g. (and in an embodiment) as described above.

It will be appreciated from the above that in embodiments the first frame (and each frame) is divided into a plurality of regions (e.g. tiles). The method of the technology described herein is accordingly in an embodiment performed for plural regions of the set of plural regions that the (and each) (rendered or processed) frame has been divided into. Thus, in an embodiment plural, and in an embodiment some or all (and in an embodiment all), of the regions that the first frame has been divided into are each compared with a corresponding region of the another frame.

In an embodiment, the operation in the manner of the technology described herein is performed for each and every region of the set of regions that the first frame has been divided into. However, in another embodiment, the operation in the manner of the technology described herein is performed for only some but not all of the regions of a set of plural regions that a (rendered or processed) (e.g. the first) frame has been divided into, if desired. For example, historical comparison data could be maintained and used to identify those regions that may be more or less likely to be similar, and the comparison process tailored accordingly (e.g. to skip the comparison process for those regions that historical data suggests should be different to the corresponding another frame region).

In another example, and in an embodiment, a subset of (some but not all of) the set of plural regions that a (e.g. the first) (rendered) frame has been divided into is selected, and the operation in the manner of the technology described herein is performed for (only) the selected subset of (some but not all of) the set of plural regions. In such embodiments, the subset of the set of plural regions may be selected, e.g. and in an embodiment, based on received view (head) orientation data, e.g. such that the operation in the manner of the technology described herein is performed (only) in respect of regions corresponding to a (selected) field of view (that is narrower than the field of view of the (first) (rendered) frame) corresponding to the received view (head) orientation data.

Thus, in an embodiment, the at least one region of the set of regions that the first frame has been divided into (that the operation in the manner of the technology described herein is performed for) comprises a selected subset of (some but not all of) the set of regions that the first frame has been divided into, wherein the subset is in an embodiment selected based on received view (head) orientation (pose) data.

Other arrangements would, of course, be possible.

The comparison of a region of the first (e.g. rendered or processed) frame with a corresponding region of the another (e.g. second, earlier rendered or processed) frame can be done in any suitable and desired manner. Thus, for example, some or all of the content of the region of the first frame may be compared with some or all of the content of the corresponding region of the another frame (and in an embodiment this is done).

The comparison can be used to determine whether the frame regions are similar (or not) in any suitable and desired manner. The comparison process may, e.g., require an exact match for the frame regions to be considered to be similar (or the same), or only a sufficiently similar (but not exact) match, e.g., that exceeds a given threshold, could be required for the frame regions to be considered to be similar.

It will be appreciated that determining whether the respective frame regions are dissimilar may comprise determining whether the respective frame regions are similar, and then determining that the respective frame regions are dissimilar when it is not (when it is other than) determined that the respective frame regions are similar, and not determining that the respective frame regions are dissimilar when it is determined that the respective frame regions are similar.

In one embodiment, the comparison is performed by comparing lower resolution versions and/or lower precision versions of the respective (first and second) frame regions to assess the similarity or otherwise of the frame regions.

In an embodiment, the comparison is performed by comparing information representative of and/or derived from the content of the first frame region with information representative of and/or derived from the content of the another frame region to assess the similarity or otherwise of the regions. Thus, in an embodiment, information representative of and/or derived from the content of each frame region is generated for each frame region that is to be compared.

The information representative of the content of the frame regions is in an embodiment in the form of information representative of the content of each frame region (e.g. tile). This information for each frame region (e.g. tile) may take any suitable form, but is in an embodiment based on or derived from the content of the respective frame region. In an embodiment it is in the form of a "signature" for the frame region which is generated from or based on the content of the frame region. Such a frame region content "signature" may comprise, e.g., and in an embodiment, any suitable set of derived information that can be considered to be representative of the content of the frame region, such as a checksum, a CRC, or a hash value, etc., derived from (generated for) the data (elements) for the frame region. Suitable signatures would include standard CRCs, such as CRC32, or other forms of signature such as MD5, SHA 1, etc.

Thus, in an embodiment, a signature indicative or representative of, and/or that is derived from, the content of each frame region is generated for each frame region that is to be compared, and the comparison process comprises comparing the signatures of the respective frame regions. In an embodiment a content-indicating signature is generated for plural, and in an embodiment for each, frame region that a frame is divided into, in an embodiment as the frame is being generated, with the frame region signatures then being stored appropriately in association with the frame (with the frame regions) for later use.

In an embodiment, where a frame to be compared is a rendered frame, then a content-indicating signature for a (each) region of the rendered frame to be compared is generated as the rendered frame region is being generated (rendered), and similarly, where a frame to be compared is a processed frame, then a content-indicating signature for a (each) region of the processed frame to be compared is in an embodiment generated as the processed frame region is being generated (processed). In this regard, the Applicants have recognised that generating content-indicating signatures for frame regions as the frame regions are being generated (rendered or processed), means that the content-indicating signatures can be generated without, for example, needing to re-load frame region data from memory, thereby saving processing and memory bandwidth, etc.

In would also be possible, however, to generate a content-indicating signature for a (each) region of a (rendered or processed) frame to be compared when the content-indicating signature is needed for the comparison, for example.

It would be possible to generate a single signature for a frame region (e.g. tile). Where a frame region that is to be compared includes plural sub-regions (e.g. tiles), for example, then a signature could be generated for each of the plural sub-regions (tiles), and a single signature for the frame region could then be generated based on the plural signatures for the plural sub-regions (tiles). Alternatively, plural signatures could be generated for each frame region (e.g. one for each sub-region (tile)).

In one such embodiment, a signature representative of the most significant bits (MSBs) of the content of each frame region and a signature representative of the least significant bits (LSBs) of the content of each frame region is generated for each frame region that is to be compared, and the comparison process comprises comparing one or both of these signatures for the respective frame regions.

It would also or instead be possible, for example, for separate signatures (e.g. CRCs) to be generated for each (e.g. colour (e.g. RGB) or luma and chroma (YUV)) plane.

As will be appreciated by those skilled in the art, the longer the signature that is generated for a frame region is (the more accurately the signature represents the frame region), the less likely there will be a false "match" between signatures. Thus, in general, a longer or shorter signature (e.g. CRC) could be used, depending on the accuracy desired (and as a trade-off relative to the resources required for the signature generation and processing, for example).

In an embodiment, the signature is weighted towards a particular aspect of the frame's content as compared to other aspects of the frame's content (e.g., and in an embodiment, to a particular aspect or part of the data for the frame region (the data representing the frame's content)). This may allow, e.g., a given overall length of signature to provide better overall results by weighting the signature to those parts of the content (data) that will have more effect on the overall output (e.g. as perceived by a viewer of the frame).

In one such embodiment, a longer (more accurate) signature is generated for the MSB bits of a colour as compared to the LSB bits of the colour. (In general, the LSB bits of a colour are less important than the MSB bits, and so the Applicants have recognised that it may be acceptable to use a relatively inaccurate signature for the LSB bits, as errors in comparing the LSB bits for different frame regions (e.g. tiles) will, the Applicants believe, have a less detrimental effect on the overall output.)

It would also be possible to use different length signatures for different applications, etc., depending upon the, e.g., application's, e.g., display, requirements. This may further help to reduce power consumption.

Thus, in an embodiment, the technology described herein comprises comparing a signature representative of the content of a region (e.g. a tile) of the first (e.g. rendered or processed) frame with a signature representative of the content of a corresponding region (e.g. tile) of the another (e.g. second, earlier rendered or processed) frame, and determining whether the frame regions are dissimilar (or different) (or not) using that comparison.

Other arrangements would be possible.

The comparison operation and/or the generation of signatures may be performed by any suitable part of the graphics processing system. The comparison operation and/or the generation of signatures is in an embodiment performed by a (or the) graphics processing unit (a graphics processor) of the graphics processing system, but it could also or instead be performed by another component or components of the overall graphics processing system, such as a CPU or a video processor, if desired.

As described above, in the technology described herein it is determined whether (or not) a region of the first frame contains one or more objects to be extrapolated (only) when it is determined that the region of the first frame is dissimilar to the corresponding region of the another frame.

Thus, in an embodiment of the technology described herein, whether (or not) the first frame contains one or more objects whose motion needs to be extrapolated to generate the extrapolated frame is determined (only) for regions of the first frame that are determined to be dissimilar (e.g. different) to a respective corresponding region of the another frame, but determining whether (or not) the first frame contains one or more objects whose motion needs to be extrapolated to generate the extrapolated frame is omitted for regions of the first frame that are not determined to be dissimilar to (e.g. that are determined to be similar to, or the same as) a corresponding region of the another frame.

Thus, in an embodiment of the technology described herein, the method comprises (and the system is configured to) when it is not determined that the region of the first frame is dissimilar to (e.g. when it is determined that the region of the first frame is similar to, or the same as) the corresponding region of the another frame, omitting determining whether the region of the first frame contains one or more objects, the motion of which needs to be extrapolated to generate the extrapolated frame, and/or determining that the region of the first frame does not contain one or more objects, the motion of which needs to be extrapolated to generate the extrapolated frame.

Determining whether a region of the first frame contains one or more objects, the motion of which needs to be extrapolated to generate the extrapolated frame, can be performed in any suitable and desired manner. In an embodiment, determining whether a region of the first frame contains one or more objects to be extrapolated comprises determining whether the region contains one or more moving objects, and determining that the region contains one or more objects to be extrapolated when it is determined that the region contains one or more moving objects. It will be appreciated here, that such (determined) moving objects should (and in an embodiment do) move in the scene being rendered with respect to static (e.g. background) objects in the scene.

Determining whether a frame region contains one or more moving objects can be performed in any suitable and desired manner. In an embodiment, determining whether a frame region contains one or more moving objects (and so determining whether the frame region contains one or more objects, the motion of which needs to be extrapolated to generate the extrapolated frame) comprises subjecting the frame region to a motion estimation and/or object detection operation.

For example, a motion estimation operation (process) could be used to determine if there is general motion for the frame region, while an object detection operation (process) could be used to detect if there is an object or objects in the frame region, for example using edge detection. The motion estimation operation and the object detection operation could comprise a single object motion detection operation, or the motion estimation operation and the object detection operation could be separate operations with the results of those separate operations being combined appropriately to detect object motion, if desired.

Additionally or alternatively, moving objects could be detected using a parallax comparison of left eye and right eye frames, and/or using depth (z-buffer) information. It will be appreciated that object motion including translational movement, rotational movement and/or scaling can be (and in an embodiment is) detected (determined).

Such operations may be implemented in hardware and/or software, as desired. Thus, for example, determining whether a frame region contains one or more moving objects (and/or determining whether a frame region contains one or more objects, the motion of which needs to be extrapolated to generate the extrapolated frame) may be performed by a (or the) graphics processing unit (GPU) (a graphics processor) of the graphics processing system, or another component or components of the overall graphics processing system, such as a CPU or a video processor, if desired.

Thus, in an embodiment of the technology described herein, the method comprises (and the system is configured to) when it is determined that the region of the first frame is dissimilar (e.g. different) to the corresponding region of the another frame, determining whether (or not) the region of the first frame contains one or more moving objects.

Correspondingly, in an embodiment of the technology described herein, the method comprises (and the system is configured to) when it is not determined that the region of the first frame is dissimilar to (e.g. when it is determined that the region of the first frame is similar to, or the same as) the corresponding region of the another frame, omitting determining whether (or not) the region of the first frame contains one or more moving objects.

It will be appreciated that a motion estimation and/or object detection operation, such as described above, can be used, as well as to determine whether (or not) a frame region contains one or more moving objects, to determine the motion (e.g. velocity and/or rotation, etc.) of those objects. Thus, in an embodiment, the method comprises (and the system is configured to) when it is determined that the region of the first frame is dissimilar (e.g. different) to the corresponding region of the another frame (and when it is determined that the region of the first frame contains one or more objects, the motion of which needs to be extrapolated to generate the extrapolated frame), determining the motion of (any) (moving) objects that the region of the first frame contains.

Correspondingly, in an embodiment, the method comprises (and the system is configured to) when it is not determined that the region of the first frame is dissimilar to (e.g. when it is determined that the region of the first frame is similar to, or the same as) the corresponding region of the another frame (and/or when it is not determined that the region of the first frame contains one or more objects, the motion of which needs to be extrapolated to generate the extrapolated frame), omitting determining the motion of (any) (moving) objects that the region of the first frame contains.

As discussed above, in an embodiment, when it is determined that the region of the first frame contains one or more objects, the motion of which needs to be extrapolated to generate the extrapolated frame, the method further comprises (and the system is configured to) extrapolating the motion of those one or more objects to generate the extrapolated frame, e.g. and in an embodiment, based on (the) determined object motion (for the region), e.g. determined as discussed above.

Correspondingly, when it is not determined that the region of the first frame contains one or more objects, the motion of which needs to be extrapolated to generate the extrapolated frame (e.g. when it is determined that the region of the first frame does not contain one or more objects to be extrapolated, and/or when it is not determined that the region of the first frame is dissimilar to the corresponding region of the another frame), then extrapolating the motion of those one or more objects is in an embodiment omitted.

Thus, in an embodiment, the extrapolated frame is generated by extrapolating the motion of (only) objects that are contained in a region (or regions) of the first frame determined to contain one or more objects, the motion of which needs to be extrapolated to generate the extrapolated frame (and determined to be dissimilar to a corresponding region of the another frame).

Extrapolating the motion of an object or objects (in a frame region that it has been determined contains one or more objects to be extrapolated) to generate the extrapolated frame can comprise any suitable and desired extrapolation process. For example, there could be a predefined "extrapolation" process, e.g. translation, that is to be applied to the objects (in respect of those regions where it is determined there are one or more objects to be extrapolated).

Additionally or alternatively, the extrapolation process (e.g. translation) to use could be determined in use. For example, the application that is requiring the graphics processing could also configure and indicate the extrapolation process to be used.

Additionally or alternatively, the movement of objects within the frame region could be determined in use, for example as described above, e.g. using a (or the) motion estimation/object detection operation (process). For example, frame regions could be compared in a similar manner to that described above for the operation of determining whether a frame region contains objects to be extrapolated or not, with the results of that comparison then being used as a measure of the extrapolation (e.g. translation, rotation and/or scaling) to apply to an object. For example, successive frames in a sequence of frames could be analysed to assess the movement of objects within the scene (frame region), and then that determined object movement used to control the extrapolation operation (e.g. the translation that is applied to objects within frame regions that are determined to contain objects to be extrapolated).

Thus, once the motion of an object to be extrapolated has been determined, the object is in an embodiment translated, rotated and/or scaled to the appropriate point in the extrapolated frame based on the determined object motion (to generate the extrapolated frame). It will be appreciated that translating, rotating and/or scaling an object in this manner may reveal regions of the scene that were previously occluded by the object. In this case, pixel values of any such "disoccluded" regions of the extrapolated frame may also be determined, e.g. and in an embodiment, based on the contents of previous frames.

The extrapolated frame that is to be (and that is) generated can be any suitable and desired frame (image) that is generated by extrapolating object motion. The extrapolated frame (image) may comprise an array of data elements (sampling positions) (e.g. pixels), for each of which appropriate data (e.g. a set of colour values) is generated.

The extrapolated frame should (and in an embodiment does) represent an extrapolated (e.g. "spacewarped") version of a rendered frame. Thus, moving objects shown in the rendered frame that the extrapolated frame represents an extrapolated version of should be (and in an embodiment are) shown appropriately extrapolated (e.g. displaced, rotated and/or scaled) in the extrapolated frame. Accordingly, the extrapolated frame in an embodiment represents a view of the same scene that the rendered frame it represents an extrapolated version of represents, but at a later point in time, and moving objects are in an embodiment shown in the extrapolated frame (e.g. at expected positions) extrapolated forward in time to that later point in time.

In an embodiment, the rendered frame that the extrapolated frame represents an extrapolated version of is a frame in a sequence of successive rendered frames representing successive views of a scene, and the extrapolated frame represents a view of the scene at a point in time after the point in time that the rendered frame it represents an extrapolated version of represents a view of the scene at, but before a point in time that a next rendered frame in the sequence of rendered frames represents a view of the scene at. Thus, in an embodiment, the extrapolated frame represents an extrapolated view of the scene at a point in time in between points in time that consecutive (graphics processing unit (GPU)) rendered frames represent a view of the scene at.

The extrapolated frame can represent an extrapolated version of (and be generated from) any suitable and desired rendered frame. For example and in an embodiment, where the first frame is a first processed frame (and the another frame is a second processed frame), then the extrapolated frame could represent an extrapolated version of the same rendered frame that the first (and/or second) processed frame represents a processed version of, or a different, e.g. later, rendered frame. Similarly, where the first frame is a first rendered frame, and the another frame is a second, earlier rendered frame, then the extrapolated frame could represent an extrapolated version of the first rendered frame, the second, earlier rendered frame or another rendered frame.

In an embodiment, however, the first frame is a first rendered frame (and the another frame is a second, earlier rendered frame), and the extrapolated frame is generated (by extrapolating object motion) from the first rendered frame. Thus, in an embodiment, the extrapolated frame represents an extrapolated version of the first (rendered) frame.

The extrapolated frame is in an embodiment generated by a (or the) graphics processing unit (GPU) (a graphics processor) of the graphics processing system, but it could also or instead be generated or provided by another component or components of the overall graphics processing system, such as a CPU or a video processor, if desired.

The extrapolated frame (image) may be stored in (written to) memory for subsequent use as desired. For example, the extrapolated frame (image) may be stored in a frame buffer in memory, from where it can then be read for further processing and/or for display by a (or the) display controller. Such a memory may comprise any suitable memory and may be configured in any suitable and desired manner. For example, it may be a memory that is on chip with the graphics processing unit (GPU) or it may be an external memory. In an embodiment it is an external memory, such as a main memory of the graphics processing system. It may be dedicated memory for this purpose or it may be part of a memory that is used for other data as well.

The extrapolated frame (image) may be stored in a different memory to the first frame and/or the another (e.g. second, earlier rendered) frame. However, in an embodiment, the extrapolated frame (image) is stored in the same memory as the first frame and/or the another frame.

In an embodiment, the extrapolated frame is generated on a region-by-region basis. Thus, in an embodiment, the method comprises (and the system is configured to), when is it determined that the region of the first frame is dissimilar (e.g. different) to the corresponding region of the another frame (and when it is determined that the region of the first frame contains one or more objects, the motion of which needs to be extrapolated to generate the extrapolated frame), generating a corresponding extrapolated area (region) for the extrapolated frame by extrapolating object motion (from the region of the first (rendered) frame).

In this embodiment, the extrapolated area (region) (for the extrapolated frame) may be generated in any suitable and desired manner. It should be (and in an embodiment is) generated based on object motion from the corresponding region of the rendered frame that the extrapolated frame represents an extrapolated version of. Thus, in an embodiment, the extrapolated area (region) (for the extrapolated frame) is generated based on object motion from the region of the first rendered frame (that is compared with the corresponding region of the second, earlier rendered frame).

Thus, the extrapolated area in an embodiment represents an extrapolated (e.g. "spacewarped") version of the region of the first (rendered) frame. Thus, moving objects shown in the region of the first (rendered) frame should be (and in an embodiment are) shown at extrapolated (expected) e.g. positions in the extrapolated area, with the extrapolation in an embodiment being performed based on the (expected) movement of those moving objects from the first (rendered) frame region.

A (each) extrapolated area (region) can represent (and be generated for) any suitable and desired area of the extrapolated frame, such as the whole of the extrapolated frame, one or more (in an embodiment corresponding) regions (e.g. tiles) of the extrapolated frame, and/or an area of the extrapolated frame that is displaced, rotated and/or scaled relative to the region of the rendered frame from which it is generated with respect to the respective frame, e.g. and in an embodiment based on (determined) object motion.

As discussed above, the extrapolation process used for generating the extrapolated area (from the first (rendered) frame region) based on object motion can be performed in any suitable and desired manner, and there could, for example, be a predefined "extrapolation" process, e.g. translation, that is to be applied to objects to be extrapolated (in the first (rendered) frame region), and/or the extrapolation process (e.g. translation) to use could be determined and/or indicated in use.

On the other hand, in an embodiment, the method comprises (and the system is configured to), when is it not determined that the region of the first frame is dissimilar to (e.g. when it is determined that the region of the first frame is similar to, or the same as) the corresponding region of the another frame (and/or when it is not determined that the region of the first frame contains one or more objects, the motion of which needs to be extrapolated to generate the extrapolated frame), omitting generating a corresponding extrapolated area (region) for the extrapolated frame by extrapolating object motion (from the region of the first (rendered) frame).

The Applicants have recognised that, in this case, when it is not determined that the corresponding frame regions are (sufficiently) dissimilar, e.g. similar or the same (not different) (and/or when it is not determined that the region of the first frame contains one or more objects to be extrapolated to generate the extrapolated frame), then it may be possible to use the compared region of the first (rendered) frame (or the corresponding region of the another (e.g. second, earlier rendered) frame) as a corresponding area (region) for the extrapolated frame. Thus, in an embodiment, the region of the first (rendered) frame or the corresponding region of the another (second, earlier rendered) frame is used as a corresponding area (region) for the extrapolated frame. In an embodiment, the region of the first (rendered) frame is used for the extrapolated frame.

Using a (compared) frame region as a corresponding area (region) for the extrapolated frame may comprise copying the frame region. For example, the frame region may be copied from the frame buffer storing the respective frame to the frame buffer storing the extrapolated frame.

It will accordingly be appreciated that the (and each) extrapolated frame will in an embodiment be made up of a plurality of areas (regions), with each area (region) of the extrapolated frame (in an embodiment) representing a part of (some but not all of) the overall extrapolated frame. (Each extrapolated frame area (region) should (and in an embodiment does) represent an appropriate portion (area) of the extrapolated frame (plurality of data elements within the array).)

Thus, in one embodiment, the extrapolated frame is generated as (and divided (partitioned) into) one or more (in an embodiment regularly sized and shaped) regions (a set of plural identifiable smaller regions (e.g. tiles)), each representing a part of (some but not all of) the overall extrapolated frame.

The (and each) extrapolated frame region in an embodiment has the same configuration, e.g. size and/or shape, as the regions that the (first) rendered frame from which it is generated is divided into. Accordingly, each extrapolated frame region in an embodiment has the same number (and arrangement) of data elements as the regions of the (first) rendered frame from which it is generated. (However, it would also be possible for extrapolated frame regions to differ from the (first) rendered frame regions, if desired.)

In one embodiment, an (and in an embodiment each) extrapolated frame region (whether extrapolated from, or copied from, a (first) rendered frame region) directly corresponds (in position) to the region of the (first) rendered frame that it corresponds to, i.e. the extrapolated frame region has the same positioning (of data elements) within the extrapolated frame as the positioning of the (data elements of the) region within the (first) rendered frame from which it is generated.

In another embodiment, however, an (and in an embodiment each) extrapolated frame region does not directly correspond (in position) to the (first) rendered frame region that it corresponds to. For example, an extrapolated frame region and the corresponding (first) rendered frame region may be shifted (translated), rotated and/or scaled relative to each other with respect to the respective frame. Such a shift (translation), rotation and/or scaling may be based, e.g. (and in an embodiment), on a change in view (head) orientation (pose), e.g. due to camera movement (e.g. camera panning) (e.g. as described above), and/or (determined) object motion.

It will be appreciated from the above that the extrapolated frame may, and in an embodiment does, comprise both regions (areas) that have been extrapolated from a rendered frame region, and regions that have not been extrapolated from a rendered frame region (that are copied from (that are copies of) a (rendered) frame region). Thus, in an embodiment, the method of the technology described herein comprises (and the processing circuitry is configured to) generating an extrapolated frame that comprises a plurality of regions, with one or more of the regions of the extrapolated frame being generated by extrapolating object motion from a region of a rendered frame (e.g. the first rendered frame), and one or more other regions of the extrapolated frame comprising a region or regions of a (rendered) frame (e.g. the first (rendered) frame or the another (e.g. second, earlier rendered) frame).

In an embodiment, the extrapolated frame is subjected to a transformation, e.g., and in an embodiment, by timewarp processing, to generate a transformed (timewarped) frame (image) that may then be provided for display (e.g. by a (or the) display controller of the graphics processing system). The transformation may also or instead include a lens distortion correction transformation, a chromatic aberration (distortion) correction transformation, and/or another suitable transformation.

The transformation may be performed in any suitable and desired manner. The transformation (e.g. timewarp processing) is, in an embodiment, performed by the graphics processing unit (GPU), a (or the) display controller, or a dedicated image processor of the graphics processing system.

The transformed extrapolated frame (image) may be stored in (written to) memory for subsequent use as desired. For example the transformed (e.g. timewarped) frame (image) may be stored in a frame buffer in memory from where it can then be read for further processing and/or for display by a (or the) display, e.g. controller. Again, such a memory can comprise any suitable and desired memory of or accessible to the graphics processing system (as discussed above).

The transformation that is applied to the extrapolated frame is in an embodiment based on view (head) orientation (pose) data (e.g., and in an embodiment sensed by one or more sensors of a virtual reality (VR) and/or augmented reality (AR) (head mounted) display system that the graphics processing system is providing images for display to), which view (head) orientation (pose) data is in an embodiment sensed after the first (rendered) frame being considered has been generated (rendered) (and so in an embodiment represents a second view (head) orientation (pose) of a user of the VR and/or AR (head mounted) display system (after the first (rendered) frame has been generated (rendered))).

The so-transformed (so-timewarped) extrapolated frame thus in an embodiment represents a view of the scene being displayed based on the (sensed) (second) view (head) orientation (pose), and is in an embodiment then provided for display (to a (head mounted) display of the VR and/or AR (head mounted) display system).

Thus, in an embodiment, the method of the technology described herein further comprises (and the processing circuitry is further configured to) transform the generated extrapolated frame, in an embodiment based on (sensed) view (head) orientation (pose) data.

It would be possible in this regard to perform the (e.g. "timewarp") transformation on the extrapolated frame once the extrapolated frame has been completely generated (and, e.g., stored in memory). However, in another embodiment, the transformation (e.g. "timewarp") processing of the extrapolated frame is performed on a region-by-region basis, as regions of the extrapolated frame are generated.

Thus, in an embodiment, the technology described herein comprises performing the transformation (e.g. "timewarp") processing on respective regions of an extrapolated frame individually.

Thus, in an embodiment, the method of the technology described herein comprises (and the processing circuitry of the technology described herein is correspondingly configured to):

when it is determined that the region of the first (rendered) frame is dissimilar to the corresponding region of the another frame (and when it is determined that the region of the first frame contains one or more objects, the motion of which needs to be extrapolated to generate the extrapolated frame):
  generating a corresponding extrapolated area (region) for the extrapolated frame by extrapolating object motion; and
  subjecting the extrapolated area (region) for the extrapolated frame to a transformation based on received view (head) orientation data, to generate an output transformed extrapolated area (region) for use as a corresponding area (region) for an output frame; and, in an embodiment
when it is not determined that the region of the first (rendered) frame is dissimilar to the corresponding region of the another frame:
  using the region of the first (rendered) frame or the corresponding region of the another frame as a corresponding area (region) for the extrapolated frame; and
  subjecting the region of the first (rendered) frame or the corresponding region of the another frame to a transformation based on received view (head) orientation data, to generate an output transformed area (region) for use as a corresponding area (region) for an output frame.

As discussed above, the technology described herein is in an embodiment implemented in the context of virtual reality (VR) and/or augmented reality (AR) displays. Thus, the extrapolated frame is in an embodiment a frame generated for display. Thus, in an embodiment, the (in an embodiment transformed) extrapolated frame is provided for display (by a (or the) display controller of the graphics processing system) to a display. In an embodiment, the (e.g. transformed) extrapolated frame is provided for display to a head mounted display of a (virtual reality (VR) and/or augmented reality (AR)) head mounted display system.

Thus, in an embodiment, the first (rendered) (e.g. "application") frame is a frame (image) rendered for a (virtual reality (VR) and/or augmented reality (AR)) head mounted display system, and the extrapolated frame represents an extrapolated ("spacewarped") version of the first (rendered) (e.g. "application") frame, that is then in an embodiment transformed ("timewarped"), before being provided for display to (a head mounted display of) the (virtual reality (VR) and/or augmented reality (AR)) head mounted display system.

Such a (virtual reality (VR) and/or augmented reality (AR)) head mounted display system may include one or more sensors for sensing (tracking) the orientation (pose) of the user's head (and/or their view (gaze) direction) in use (while images are being displayed to the user on the head mounted display of the (virtual reality (VR) and/or augmented reality (AR)) head mounted display system).

In this case, the first (rendered) frame may be rendered based on a first head (view) orientation (pose) in an embodiment representing a head orientation (pose) of a user of the (virtual reality (VR) and/or augmented reality (AR)) head mounted display system that is sensed by the (one or more sensors of the) (virtual reality (VR) and/or augmented reality (AR)) head mounted display system, in an embodiment at the beginning of (the graphics processing unit (GPU)) rendering the first (rendered) (e.g. "application") frame.

The extrapolated frame in an embodiment then represents an extrapolated ("spacewarped") version of the first (rendered) (e.g. "application") frame, and the transformation (by "timewarp" processing) of that extrapolated frame is in an embodiment then based on (second) head orientation (pose) data (sensed by the (one or more sensors of the) (virtual reality (VR) and/or augmented reality (AR)) head mounted display system), that is in an embodiment sensed after the first (rendered) (e.g. "application") frame is rendered, and that in an embodiment represents a second head orientation (pose) of a user of the (virtual reality (VR) and/or augmented reality (AR)) head mounted display system (after the first frame is rendered). In this case, the extrapolated frame in an embodiment shows moving objects at expected e.g. positions extrapolated forward in time to the point in time that this (second) head orientation (pose) is sensed. Thus, in this case, the extrapolated frame in an embodiment represents a view of the scene at the point in time that this (second) head orientation (pose) is sensed.

It will be appreciated, however, that in another embodiment, the (e.g. transformed) extrapolated frame is provided for display to a display that is not head mounted, such as a hand held display of a hand held (virtual reality and/or augmented reality (AR)) display system, e.g. a mobile phone or tablet. Such a system may operate to track the movement (orientation) of the display (e.g. of the mobile phone or tablet) itself, and the display orientation data may then be used (in a similar manner to head orientation data described above) to determine how images should actually be displayed to the user on the display.

Although the technology described herein has been described above with particular reference to generating a single extrapolated frame, it will be appreciated that plural extrapolated frames may be generated (and displayed on a display). For example, plural extrapolated frames (e.g. two, four, eight etc. extrapolated frames) may be generated from a (and each) rendered frame, e.g. (and in an embodiment) during the time period that a next rendered frame is being rendered (by the graphics processing unit (GPU)).

Similarly, there may be an extrapolated frame generated for each eye, and a respective (and in an embodiment "time-warped") extrapolated frame may be displayed to each eye appropriately so as to provide a three-dimensional effect when the images are viewed.

Correspondingly, the technology described herein is in an embodiment applied to a plurality of (rendered) frames, and in an embodiment to a plurality of (rendered) frames that are being generated as a sequence of frames for display.

Thus, particularly in the case where the first (rendered) frame is part of a sequence of rendered frames, in an embodiment the process of the technology described herein of generating extrapolated frames is performed for plural rendered frames of a sequence of rendered frames, and, in an embodiment, for each rendered frame of a sequence of rendered frames. In this case, each rendered frame may, for example, be compared to its immediately preceding rendered frame in the sequence.

Other arrangements would, of course, be possible.

The technology described herein is in an embodiment implemented in and as part of an overall graphics processing system that includes one or more of: a host processor (central processing unit (CPU)), a graphics processing unit, a display controller, a video processor (codec), a system bus, and a memory controller.

The processing circuitry of the technology described herein may, e.g., form part of the graphics processing unit, the display controller and/or another suitable component of the graphics processing system, e.g. as described above, or may otherwise be provided in the graphics processing system. It may comprise programmable and/or fixed function processing circuitry, and/or may comprise dedicated processing circuitry and/or processing circuitry used for other processing as well, as desired.

The host processor may execute applications that can require graphics processing by the graphics processing unit, and send appropriate commands and data to the graphics processing unit to control it to perform graphics processing operations and to produce graphics processing (render) output required by applications executing on the host processor (including in the manner of the technology described herein).

To facilitate this, the host processor should, and in an embodiment does, also execute a driver for the graphics processing unit and a compiler or compilers for compiling shader programs to be executed by programmable shading stages of the graphics processing unit (which compiler may be, and in an embodiment is, a part of the driver).

Thus in an embodiment, the graphics processing unit is in communication with a host microprocessor (that is part of the overall graphics processing system) that executes a driver for the graphics processing unit and/or a compiler or compilers for the graphics processing unit.

Similarly, there is in an embodiment an application on the host processor that indicates a requirement for performing processing operations in the manner of the technology described herein, which requirement is then recognised by, e.g., the driver executing on, the host processor, with the, e.g. driver on, the host processor then operating to instruct the graphics processing unit to render data accordingly.

The graphics processing unit and/or host microprocessor are in an embodiment also in communication with a (head mounted) display for displaying the images generated by the graphics processing unit (thus in an embodiment the graphics processing system further comprises a display for displaying the images generated by the graphics processing unit) (e.g. via the display controller).

Similarly, the graphics processing system in an embodiment has or is in communication with a memory in which images generated by the graphics processing unit may be stored, e.g. for subsequent processing, e.g. display (e.g. via the memory controller). Thus, in an embodiment, the graphics processing system and/or unit comprises, and/or is in communication with, one or more memories and/or memory devices that store the data described herein, and/or that store software for performing the processes described herein.

The graphics processing unit can include, and in an embodiment does include, any one or more, and in an embodiment all, of the processing stages that a graphics processing unit can normally include. Thus, for example, the graphics processing unit in an embodiment includes a primitive setup stage, a rasteriser and a renderer. In an embodiment the renderer is in the form of or includes a programmable fragment shader.

The graphics processing unit is in an embodiment a tile-based graphics processing unit comprising a tile buffer for storing tile sample values and/or a write out unit that operates to write the data in the tile buffer (e.g. once the data in the tile buffer is complete) out to external (main) memory (e.g. to a frame buffer).

It will be appreciated by those skilled in the art that all of the described aspects and embodiments of the technology described herein can, and in an embodiment do, include, as appropriate, any one or more or all of the features described herein.

The technology described herein can be implemented in any suitable system, such as a suitably configured micro-processor based system. In an embodiment, the technology described herein is implemented in a computer and/or micro-processor based system.

The technology described herein is in an embodiment implemented in a portable device, such as, and in an embodiment, a mobile phone or tablet. The technology described herein is in an embodiment implemented in a virtual reality and/or augmented reality display device such as, and in an embodiment, a virtual reality and/or augmented reality headset. Thus, another embodiment of the technology described herein comprises a virtual reality and/or augmented reality display device comprising the graphics processing system of any one or more of the embodiments of the technology described herein. Correspondingly, another embodiment of the technology described herein comprises a method of operating a virtual reality and/or augmented reality display device, comprising operating the virtual reality and/or augmented reality display device in the manner of any one or more of the embodiments of the technology described herein.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the components of the graphics processing system can otherwise include any one or more or all of the usual functional units, etc., that such components include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, nontransitory medium, such as a computer readable medium, for example, diskette, CDROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrinkwrapped software, preloaded with a computer system, for example, on a system ROM or fixed disk, or distributed from a server or electronic bulletin board over a network, for example, the Internet or World Wide Web.

Embodiments of the technology described herein will now be described with reference to the Figures.

An embodiment of the technology described herein relates to providing frames (images) for display for a virtual reality (VR) and/or augmented reality (AR) head mounted display (HMD) system.

Such a system may be configured as shown in FIG. 1 (and described above), with the display 8 of the system comprising an appropriate head mounted display that includes, inter alia, a display screen or screens (panel or panels) for displaying frames to be viewed by a user wearing the head mounted display, one or more lenses in the viewing path between the user's eyes and the display screens, and one or more sensors for tracking the position (orientation (pose)) of the user's head (and/or their view (gaze) direction) in use (while images are being displayed on the display to the user).

Figure 5:
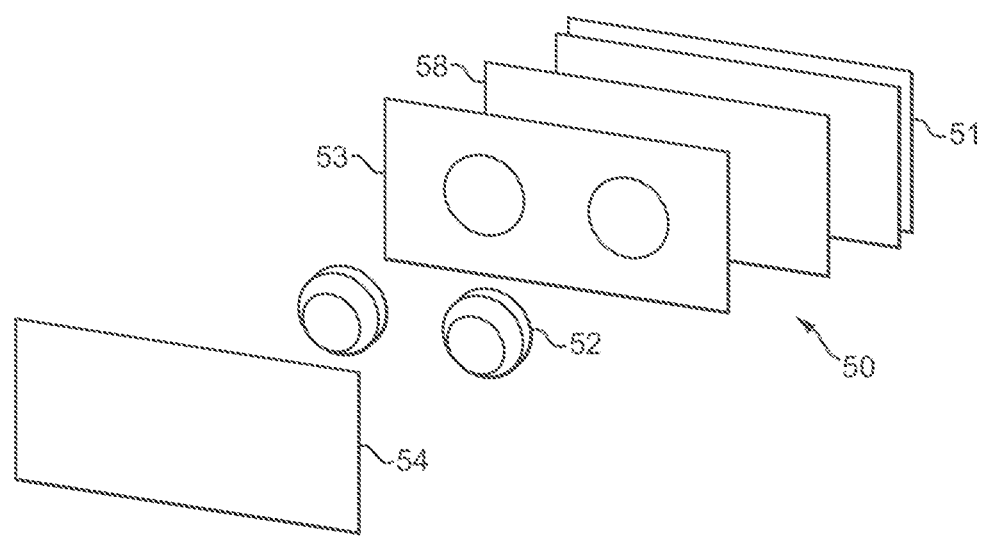
FIG. 5 shows schematically an exemplary virtual reality head mounted display headset.

FIG. 5 shows schematically an exemplary virtual reality (VR) head mounted display 50. As shown in FIG. 5, the head mounted display 50 comprises, for example, an appropriate display mount 51 that includes one or more head pose tracking sensors, to which a display screen (panel) 58 is mounted. A pair of lenses 52 are mounted in a lens mount 53 in the viewing path of the display screen 58. Finally, there is an appropriate fitting 54 for the user to wear the headset.

In the system shown in FIG. 1, images to be displayed on the head mounted display 8 will be, e.g., rendered by the graphics processing unit (GPU) 2 in response to requests for such rendering from an application executing on a host processor (CPU) 1 of the graphics processing system and store those frames in the main memory 7. The display controller 4 may then read the frames from memory 7 and provide those frames appropriately to the head mounted display 8 for display to the user.

The graphics processing unit (GPU) 2 may render a frame (image) for display for each eye: one image representing a scene as seen from the left eye, and one image representing the scene as seen from the right eye. The images may then be displayed to each eye appropriately using the head mounted display 8 so as to provide a three-dimensional effect when the images are viewed.

As discussed above, it would be possible for the graphics processing unit (GPU) 2 of the graphics processing system 10 to directly render each frame for display on the head mounted display 8 based on the user's head orientation (pose) sensed at the start of rendering a frame. However, because of various latencies in the rendering process, it can be the case that the user's head orientation (pose) has changed between the sensing of the head orientation (pose) at the beginning of the rendering of the frame and the time when the frame is actually displayed on the display 8. Moreover, it is typically desirable to update the display 8 at a rate that is faster than the graphics processing unit (GPU) 2 is able to render frames at, e.g., to avoid "judder" artefacts.

To account for this, the graphics processing system 10 may perform so-called "timewarp" processing on the frames rendered by the graphics processing unit (GPU) 2 before providing those frames to the display 8 for display to a user.

As discussed above, in "timewarp" processing, rather than the graphics processing unit (GPU) 2 directly rendering each frame (image) to be displayed on the head mounted display 8, an "application" frame is first rendered by the graphics processing unit (GPU) 2 based on the head orientation (pose) data sensed at the beginning of the graphics processing unit (GPU) 2 rendering the application frame. But then before an image is actually displayed on the display 8, further head orientation data is sensed, and that updated head orientation sensor data is used to transform the graphics processing unit (GPU) 2 rendered application frame to generate an "updated" version of the application frame that takes account of the updated head orientation (pose) data. The so-"timewarped" updated version of the application frame is then displayed on the head mounted display 8.

Figure 4:
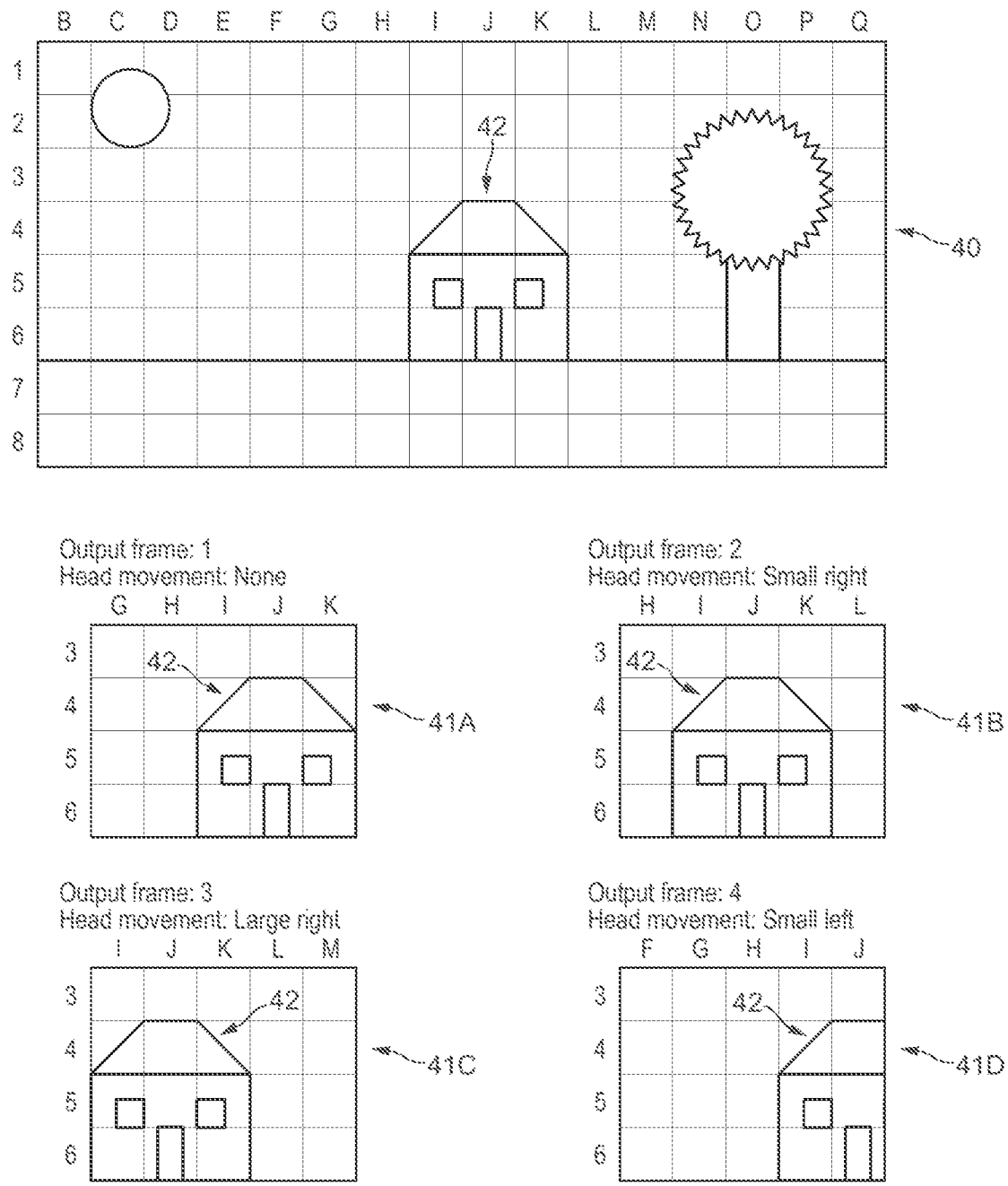
FIG. 4 illustrates an exemplary rendered "application" frame together with exemplary "timewarped" versions of that frame.

FIG. 4 shows a schematic illustration of an exemplary graphics processing unit (GPU) 2 rendered application frame 40 representing a view of a scene comprising a number of objects including house 42. In this example, application frame 40 is subjected to four timewarp processes to generate four respective timewarped frames 41A-D which may be displayed at successive time intervals while a new application frame is being rendered by the graphics processing unit (GPU) 2. The new application frame may then be subjected to four further timewarp processes, and so on.

It will be appreciated, therefore, that in the present example, timewarp processing is performed at a rate (such as 120 frames per second) that is four times faster than the graphics processing unit (GPU) 2 renders applications frames at (such as 30 frames per second). This can help to reduce "judder" artefacts and provide a smoother virtual reality (VR) or augmented reality (AR) experience, for example.

As shown in FIG. 4, in this example, application frame 40 represents a 16×8 square field of view of the scene (columns B to Q, and rows 1 to 8) that is wider (in both dimensions) than the 5×4 square field of view of the timewarped frames 41A-D that are actually displayed to the user. This ensures that graphics processing unit (GPU) 2 rendered application frame data is available to be timewarped for a wide range of possible head movements (rotations).

In the example of FIG. 4, head orientation (pose) data is sensed, and then the graphics processing unit (GPU) 2 renders the application frame 40 based on this head orientation (pose) data. Then, before an image is actually displayed on the head mounted display 8, further head orientation (pose) data is sensed and used to transform the application frame 40 to generate a first timewarped frame 41A for display.

As shown in FIG. 4, the further head orientation (pose) data indicates that no change in the user's head orientation has occurred since the original head orientation (pose) data was sensed at the beginning of the graphics processing unit (GPU) 2 rendering the application frame 40. First timewarped frame 41A therefore simply represents an appropriate window ("letterbox") (in this example, columns G to K, and rows 3 to 6) taken from the wider field of view of the application frame 40, and no timewarp transformation has been performed.

After the (first) further head orientation (pose) data is sensed, second further head orientation (pose) data is sensed and used to transform the application frame 40 again to generate a second timewarped frame 41B for display.

In the present example, as shown in FIG. 4, the second further head orientation (pose) data indicates that the user's head has made a small movement (rotation) to the right, compared to when the original head orientation (pose) data was sensed at the beginning of the graphics processing unit (GPU) 2 rendering the application frame 40. Second timewarped frame 41B therefore represents an appropriate window ("letterbox") taken from the wider field of view of the application frame 40, but has been subjected to a timewarp transformation such that, compared to first timewarped frame 41A where no head movement was detected, column L of application frame 40 has become visible, while column G is no longer visible. The effect of this is that object 42 appears shifted to the left in the second timewarped frame 41B (compared to the first timewarped frame 41A) as a result of the small right head movement.

Third (41C) and then fourth (41D) timewarped frames are then generated in a similar manner, i.e. each based on updated further head orientation (pose) data. Thus, as shown in FIG. 4, when a larger head movement to the right is detected compared to the "original" head orientation, object 42 appears shifted farther to the left in timewarped frame 41C; and when a head movement to the left is detected compared to the "original" head orientation, object 42 appears shifted to the right in timewarped frame 41D (compared to the first timewarped frame 41A where no head movement was detected).

It will be appreciated that, in the case that an upwards head movement (rotation) (relative to the original head orientation) were to be detected, object 42 would appear to shift downwards in a timewarped frame; in the case that a downwards head movement (rotation) (relative to the original head orientation) were to be detected, object 42 would appear to shift upwards in the respective timewarped frame (compared to the first timewarped frame 41A where no head movement was detected); and so forth.

Figure 6:
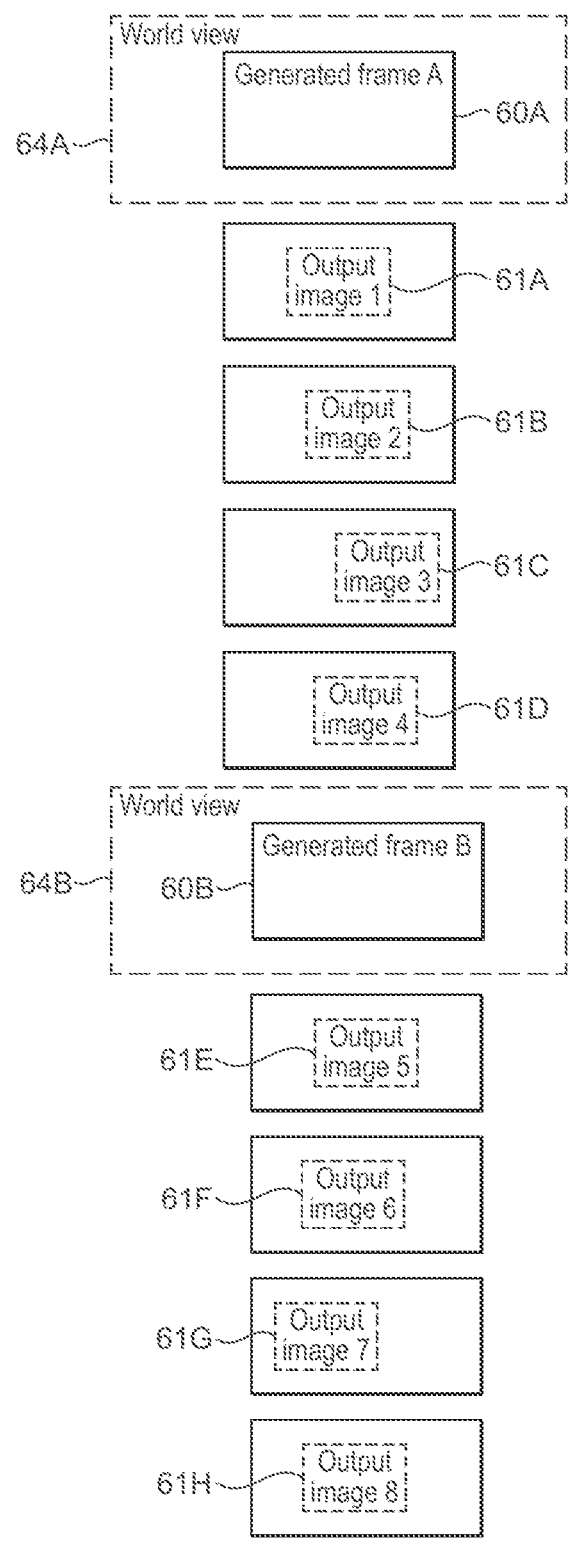
FIG. 6 schematically illustrates the process of "timewarp" processing.

FIG. 6 shows another schematic illustration of timewarp processing. As shown in FIG. 6, a first application frame 60A is initially rendered by the graphics processing unit (GPU) 2, and is then subjected to four timewarp processes to generate four respective timewarped frames 61A-D which are displayed on display 8 at successive time intervals while a second application frame 60B is being rendered by the graphics processing unit (GPU) 2. Once the second application frame 60B has been rendered, it is subjected to four further timewarp processes to generate four further respective timewarped frames 61E-H which are again displayed on display 8 at successive time intervals while the next application frame is being rendered by the graphics processing unit (GPU) 2, and so on.

As illustrated in FIG. 6, an application frame 60A, 60B can be thought of as representing a portion of a respective "world view" 64A, 64B representing a full "360 degree" view of the entire scene being rendered from a respective camera position (viewpoint). The portion of the "world view" that an application frame represents is based on a view direction corresponding to the (first) head orientation (pose) data that the application frame is rendered based on.

Similarly, a timewarped frame can represent a portion of a respective application frame, with the portion of the application frame that a timewarped frame represents being based on a view direction corresponding to the (second) head ordination (pose) data that the application frame is timewarped based on to generate the timewarped frame.

As discussed above, it has been recognised that while such timewarp processing takes account of changes to head orientation (pose) during the time period between the sensing of a (first) head orientation (pose) that an application frame is rendered based on, and the sensing of a (second) head orientation (pose) that the application frame is timewarped based on to provide a timewarped frame, it does not account for, and so timewarped frames do not show, any changes due to the motion of objects within the scene during that time period. This means that the timewarp processing of a rendered application frame that represents a dynamic scene, i.e. a scene that includes moving objects, can introduce distortions in what is displayed to a user.

Figure 7:
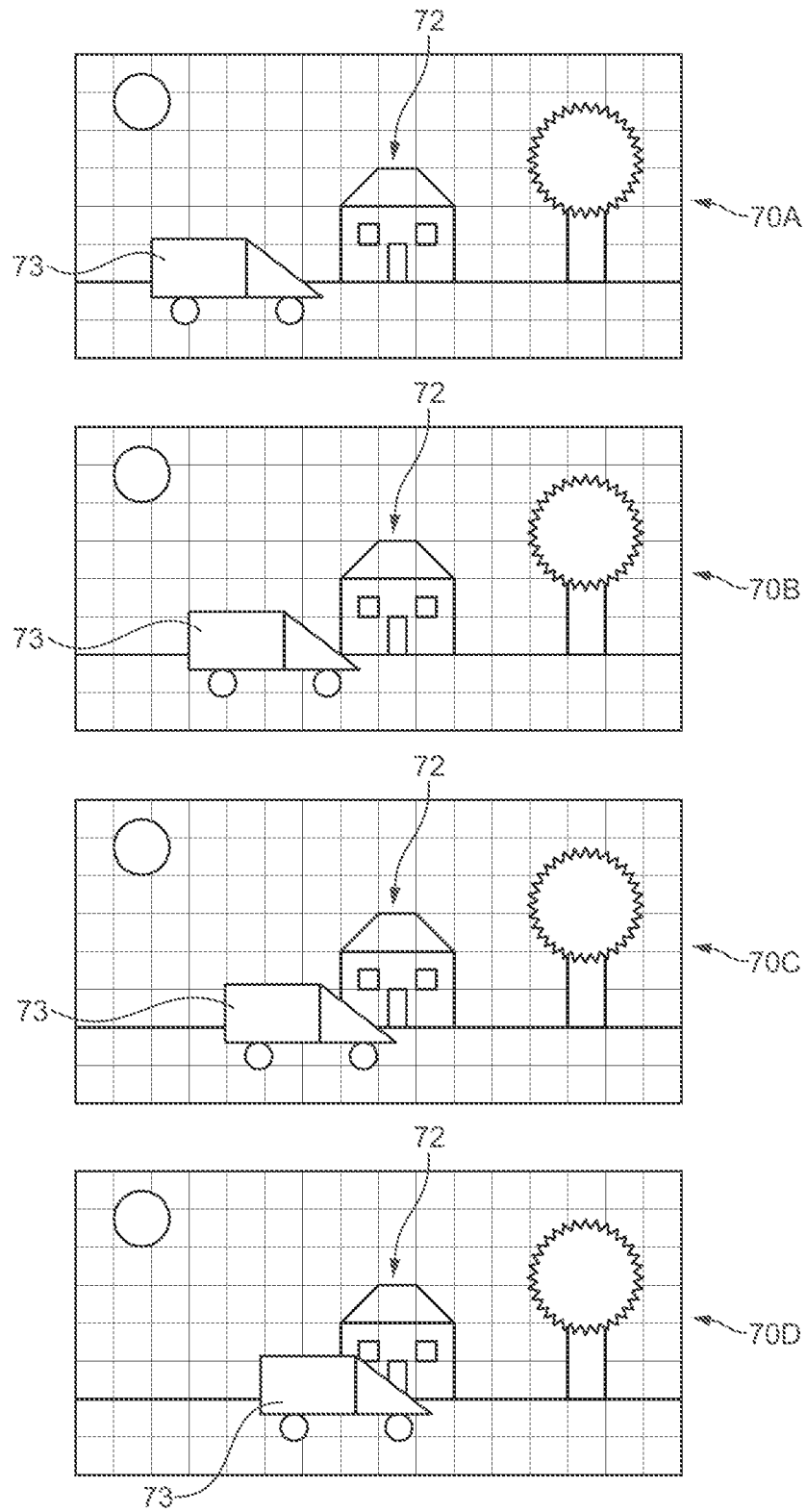
FIG. 7 shows an exemplary series of rendered frames representing successive views of an exemplary dynamic scene.

FIG. 7 illustrates an exemplar dynamic scene, which is the same scene as shown in FIG. 4, i.e. comprising a number of objects including house 72, except that it also includes an additional moving object, car 73. FIG. 7 shows four successive graphics processing unit (GPU) 2 rendered frames 70A-D which represent successive views of the dynamic scene at successive points in time.

In the scene shown in FIG. 7, car 73 is moving left to right with respect to static background objects in the scene, including house 72. Thus, the position of car 73 relative to house 72 should appear to change in time due to the motion of the car 73. Thus, as shown in FIG. 7, car 73 appears to the left of house 72 in the first graphics processing unit (GPU) 2 rendered frame 70A that represents a view of the scene at a first point in time. In a subsequent graphics processing unit (GPU) 2 rendered frame 70B that represents a view of the scene at a second, later point in time, car 73 appears farther to the right and closer to house 72 than it appeared in the earlier rendered frame 70A due to the left to right motion of car 73. Then, in the next rendered frame 70C, and the frame 70D rendered after that, car 73 continues to move further to the right in the frame and relative to house 72, such that, in this example, it moves in front of house 72.

If, however, rather than being directly rendered by the graphics processing unit (GPU) 2, each of the frames 70A-D were instead to be generated by transforming an earlier rendered application frame by timewarp processing, then each timewarped frame would show the car 73 at the same position relative to house 72 that it is shown in the earlier application frame, because, as discussed above, timewarp processing does not account for any such object motion. Thus car 73 would appear in each of the timewarped frames at a position relative to house 72 that corresponds to an earlier point in time than it should do (i.e. the point in time that the application frame represents a view of the scene at), so that car 73 would appear further to the left of house 72 than it should do. Moreover, car 73 would appear at the same position in each of the timewarped frames, and so would appear to be static in those frames. This means that distortions in what is displayed to a user would be introduced.

As discussed above, to account for object motion when performing "timewarp" processing, a process known as "spacewarp" processing has been proposed. This process attempts to take account of any motion of objects when a timewarped frame is to be generated by timewarping an application frame based on a head (view) orientation (pose) sensed at a later point in time, by extrapolating the positions of moving objects shown in the application frame to expected e.g. positions at that later point in time, with the timewarp processing then being performed on the basis of the extrapolated (expected) object positions. The so-"timewarped" and "spacewarped" updated version of the application frame is then displayed on the display 8.

Figure 8:
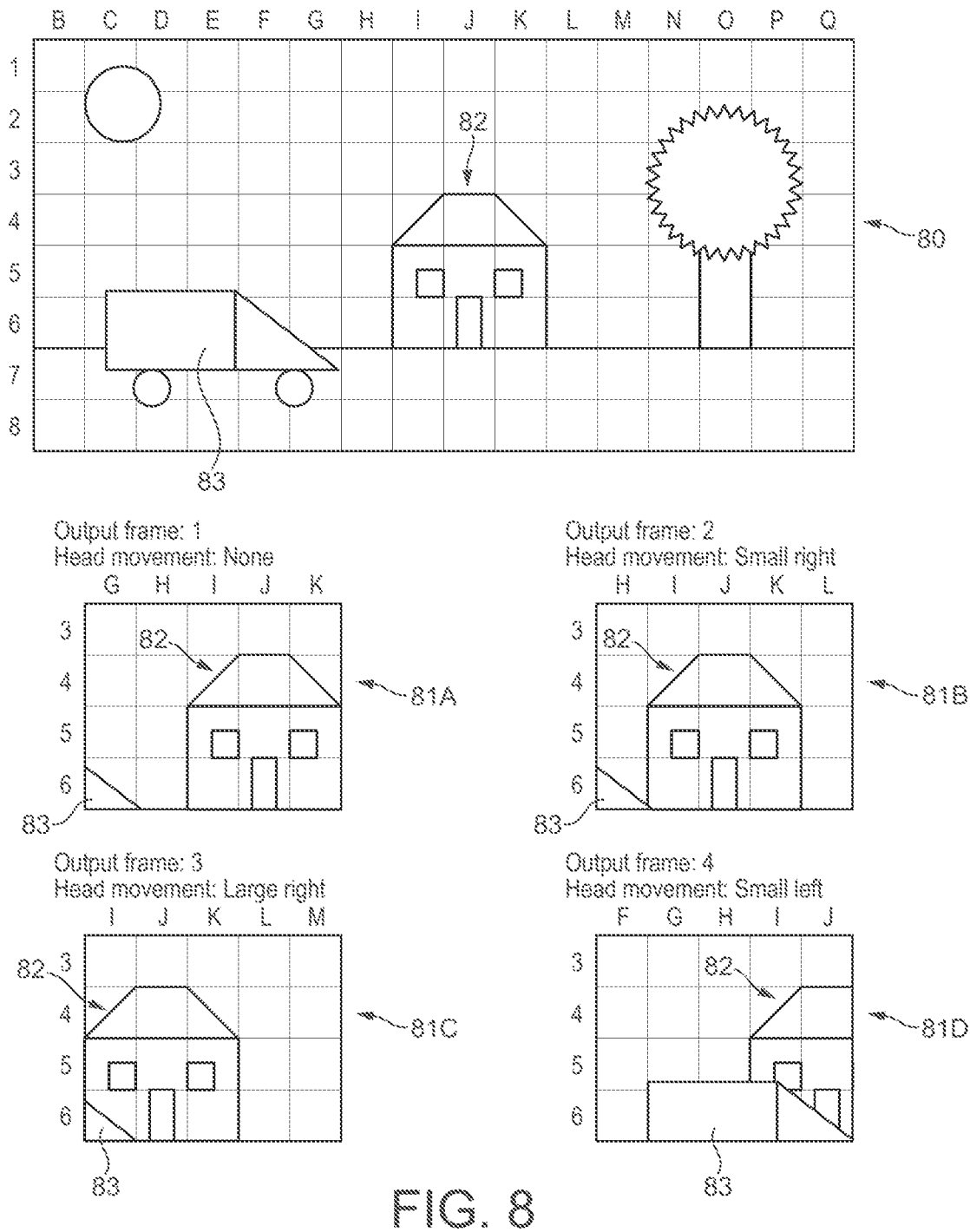
FIG. 8 illustrates an exemplary rendered "application" frame together with exemplary "timewarped" and "spacewarped" versions of that frame.

FIG. 8 illustrates this process and shows the same dynamic scene as shown in FIG. 7, i.e. comprising a number of objects including static house 82, and moving car 83. As in the example of FIG. 4, in the example of FIG. 8, (first) head orientation (pose) data is initially sensed, and then the graphics processing unit (GPU) 2 renders an application frame 80 representing a view of the scene based on that head orientation (pose) data. Thus, application frame 80 represents a "snapshot" of the dynamic scene at the point in time that the (first) head orientation (pose) data was sensed. In this "snapshot" of the dynamic scene, moving car 83 appears to the left of static house 82.

Then, in this example, as in the example of FIG. 4, the application frame 80 is subjected to four timewarp processes to generate four respective output frames 81A-D for display at successive time intervals, while a new application frame is being rendered by the graphics processing unit (GPU) 2. However, in contrast with the example of FIG. 4, the timewarp processing in the example shown in FIG. 8 is performed on the basis of extrapolated moving object positions according to "spacewarp" processing. Thus, in the example of FIG. 8, each output frame for display 81A-D represents a "timewarped" and "spacewarped" updated view of application frame 80.

Thus, after application frame 80 has been rendered and before an image is actually displayed on the head mounted display 8, further head orientation (pose) data is sensed. As shown in FIG. 8, as in the example of FIG. 4, the further head orientation (pose) data indicates that no change in the user's head orientation has occurred since the original head orientation (pose) data was sensed at the beginning of the graphics processing unit (GPU) 2 rendering the application frame 80. First output frame 81A therefore represents an appropriate window ("letterbox") taken from the wider field of view of the application frame 80, and no timewarp transformation has been performed. However, car 83 is determined to be moving, and its position in output frame 81A is thus extrapolated based on its motion by "spacewarp" processing, such that car 83 appears in output frame 81A at the position that it is expected to be at the point in time that the output frame 81A represents a view of the scene at. Thus, in this example, due to the left to right motion of car 83, moving car 83 appears closer to static house 82 in output frame 81A that it appeared in application frame 80.

Then, after the (first) further head orientation (pose) data is sensed, second further head orientation (pose) data is sensed and used to transform the application frame 80 again to generate a second output frame 81B for display.

In the example shown in FIG. 8, as in the example shown in FIG. 4, the second further head orientation (pose) data indicates that the user's head has made a small movement (rotation) to the right, compared to when the original head orientation (pose) data was sensed at the beginning of the graphics processing unit (GPU) 2 rendering the application frame 80. Second output frame 81B therefore represents an appropriate window ("letterbox") taken from the wider field of view of the application frame 80, but has been subjected to a timewarp transformation such that, compared to first output frame 81A where no head movement was detected, column L of application frame 80 has become visible, while column G is no longer visible. The effect of this is that static house 82 appears shifted to the left in the second output frame 81B (compared to the first output frame 81A) as a result of the small right head movement. Furthermore, as a result of the "spacewarp" processing, moving car 83 appears closer to static house 82 in output frame 81B than it appeared in earlier output frame 81A.

Third (81C) and then fourth (81D) output frames are then generated in a similar manner, i.e. each based on updated further head orientation (pose) data and an updated expected (extrapolated) position of moving car 83. Thus, as shown in FIG. 8, as in the example of FIG. 4, when a larger head movement to the right is detected compared to the "original" head orientation, static house 82 appears shifted farther to the left in output frame 81C; and when a head movement to the left is detected compared to the "original" head orientation, static house 82 appears shifted to the right in output frame 81D (compared to the first output frame 81A where no head movement was detected). Furthermore, as a result of the "spacewarp" processing, moving car 83 appears to pass in front of static house 82 in output frames 81C and 81D.

As discussed above, the Applicants have recognised that in known arrangements for performing "spacewarp" processing, an extrapolated ("spacewarped") frame, such as output frame 81A, is generated from a rendered application frame, such as application frame 80, by extrapolating object positions for the entirety of the extrapolated frame. Thus, in the example shown in FIG. 8, in known arrangements, output frame 81A would be generated from application frame 80 by performing an extrapolation ("spacewarp") operation in respect of the entirety of output frame 81A, i.e. columns G to K, and rows 3 to 6.

However, it may be the case that some regions of the application and extrapolated ("spacewarped") frame do not show any moving objects (or only show objects that are not moving significantly). Thus, for example, column J, row 4 of application frame 80 and output frame 81A only shows static house 82, and does not show any moving objects.

The Applicants have recognised that the positions of objects in any such regions (such as column J, row 4) should not need to be extrapolated to new positions in the extrapolated ("spacewarped") frame, since it can be assumed that these objects will not have moved (significantly). They have further recognised that such regions can be recognised in use by comparing regions of the application frame with corresponding regions of an earlier rendered application frame.

If the comparison of a region of the application frame with a corresponding region of the earlier rendered application frame shows that the compared regions are similar to (or the same as) each other, then it is assumed that these frame regions do not include any moving objects, and thus that the corresponding extrapolation ("spacewarp") operation can be omitted.

Furthermore, in this case, it may be possible to use one of the compared regions for the extrapolated ("spacewarped") frame, in place of an extrapolated region that would otherwise have been generated. Thus, for example, and in an embodiment of the technology described herein, rather than subjecting column J, row 4 of application frame 80 to an extrapolation ("spacewarp") operation, it is directly used in (copied to) output frame 81A.

If, on the other hand, the comparison of a region of the application frame with a corresponding region of the earlier rendered application frame shows that the compared regions are dissimilar (or different) to each other, then it cannot be assumed that these frame regions do not include any moving objects, and thus it is determined whether or not this is the case, for example by subjecting the region to an object motion detection operation.

The effect of this is that processing required to generate an extrapolated ("spacewarped") frame can be saved, because processing that would otherwise have been required to generate the extrapolated frame can be reduced or avoided for similar frame regions.

Figure 9:
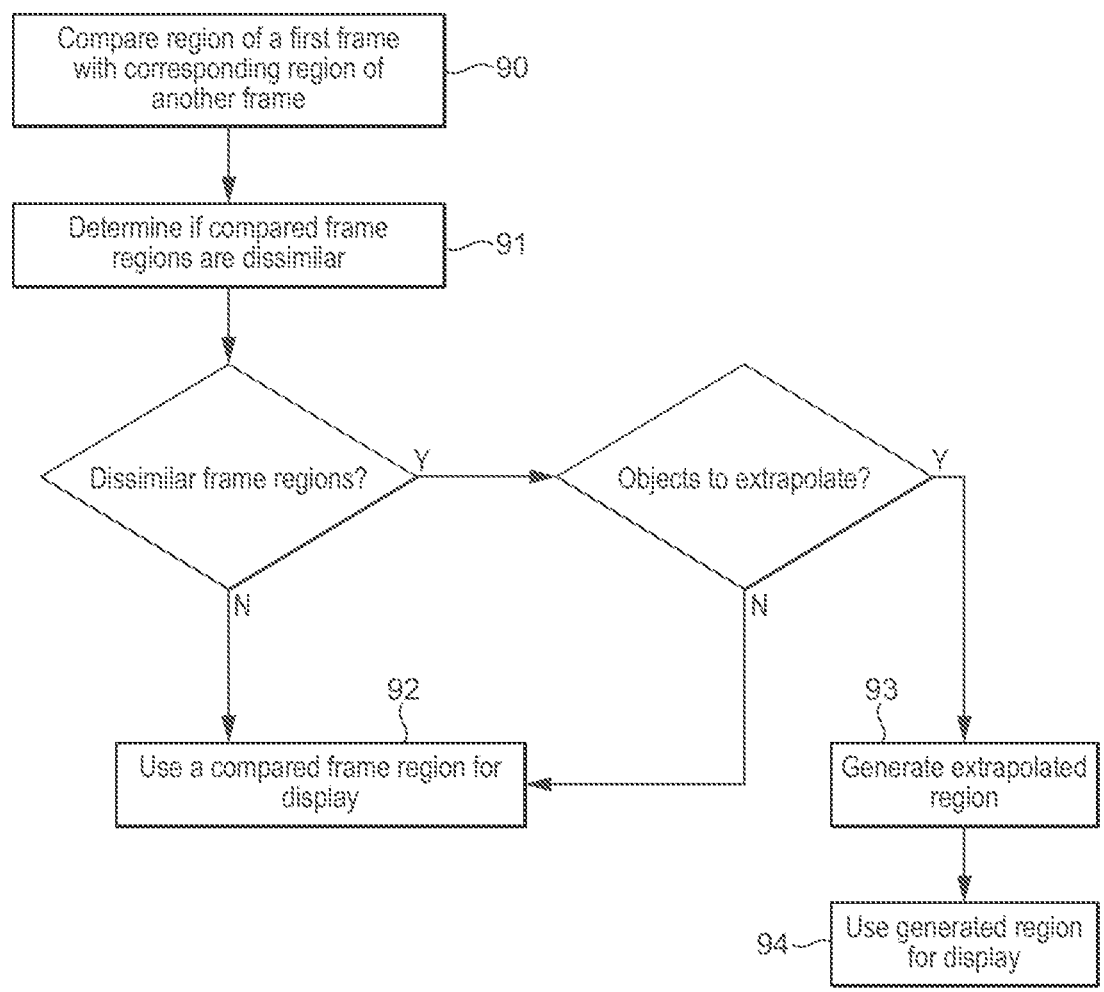
FIG. 9 is a flowchart showing schematically the operation of a graphics processing system according to an embodiment of the technology described herein.

FIG. 9 shows schematically the operation of a graphics processing system, such as is illustrated in FIG. 1, in accordance with an embodiment of the technology described herein. As shown in FIG. 9, in the present embodiment, a region of a first frame (e.g. graphics processing unit (GPU) 2 rendered "application" frame) is compared with a corresponding region of another frame (e.g. an "application" frame rendered by the graphics processing unit (GPU) 2 at an earlier point in time) (step 90). The comparison of the frame regions is then used to determine whether or not the compared frame regions are dissimilar to each other, or not (step 91).

As will be discussed further below, in an embodiment, rather than directly comparing frame region data, the comparison process of the technology described herein involves comparing signatures that are indicative of the content of the regions to be compared.

If the compared frame regions are not determined to be dissimilar to (e.g. if they are determined to be similar to, or the same as) each other, then it is assumed that the compared frame regions do not contain any objects that need to be extrapolated. In this case, the corresponding extrapolation ("spacewarp") operation may be omitted, and one of the compared frame regions may be used for display (instead of an extrapolated region) (step 92). Thus, in this case, one of the compared frame regions may be transformed by timewarp processing to provide an output frame region for display.

If, on the other hand, the compared frame regions are determined to be dissimilar (e.g. different) to each other, then it cannot be assumed that the compared frame regions do not contain any objects that need to be extrapolated, and so it is determined whether or not the frame regions contain any objects to be extrapolated (e.g. by subjecting the frame regions to a motion estimation/object detection operation). It may then be determined that the frame regions do not contain any objects to be extrapolated, in which case the corresponding extrapolation ("spacewarp") operation may be omitted, and one of the compared frame regions may be used for display instead (instead of an extrapolated region) (step 92). Thus, in this case, again, one of the compared frame regions may be transformed by timewarp processing to provide an output frame region for display.

If, however, it is determined that the frame regions contain objects to be extrapolated, then those objects may be extrapolated, such that a corresponding extrapolated region (area) is generated, e.g. by "spacewarp" processing (step 93). The generated extrapolated region (area) may then be used for display (step 94), e.g. by transforming the generated extrapolated region (area) by timewarp processing to provide an output frame region for display.

Figure 10:
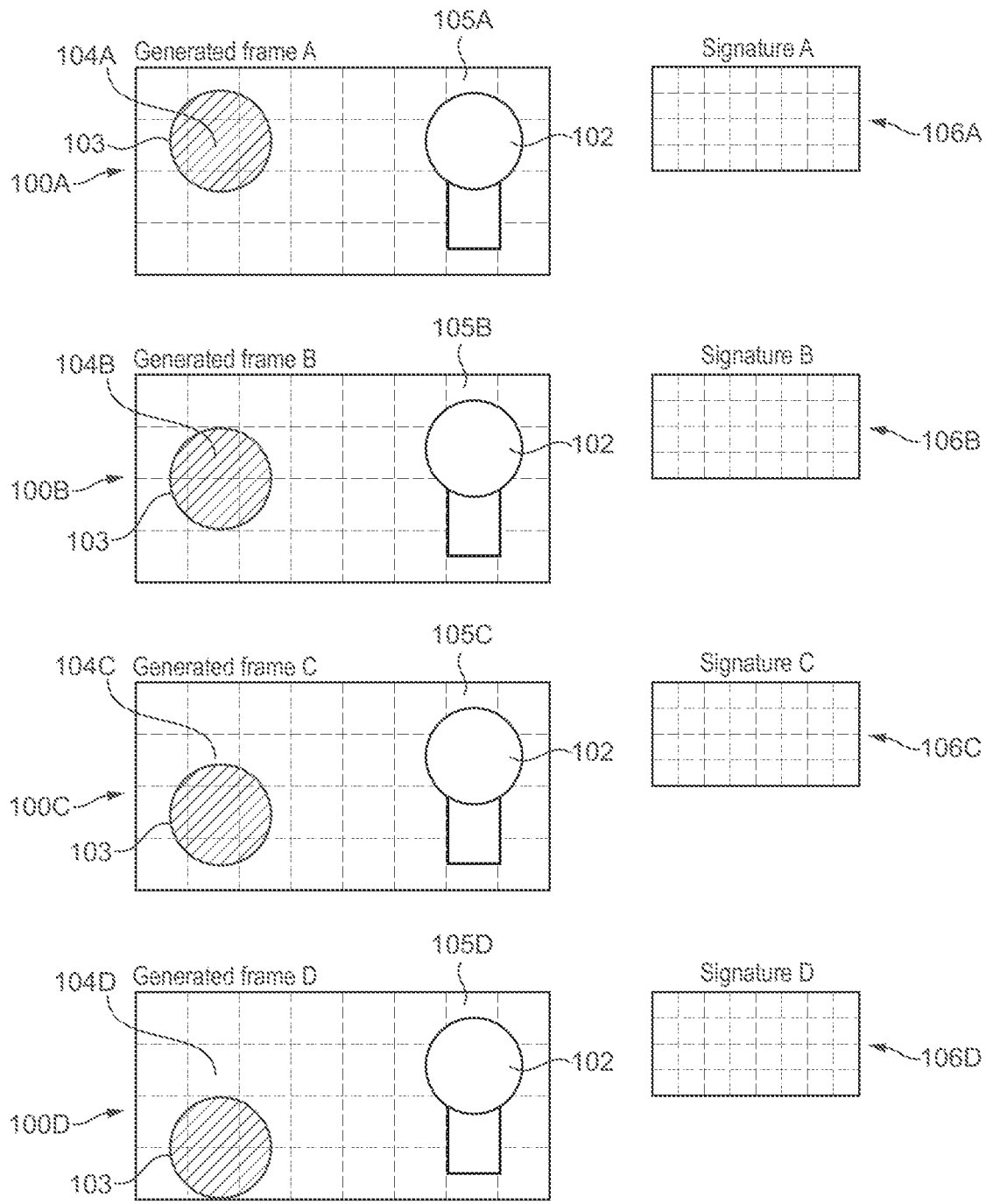
FIG. 10 shows an exemplary series of rendered frames representing successive views of an exemplary dynamic scene together with the generation of signature data representing the content of sub-regions of those frames.

FIG. 10 illustrates this operation of this embodiment of the technology described herein and shows a series of successive graphics processing unit (GPU) 2 rendered application frames 100A-D representing successive views of a dynamic scene that includes a static object 102 and a moving object 103.

In the scene shown in FIG. 10, moving object 103 is moving downwards with respect to static object 102. Thus moving object 103 appears towards the top of a first graphics processing unit (GPU) 2 rendered application frame 100A, but then, in subsequent second to fourth graphics processing unit (GPU) 2 rendered application frames 100B-D, appears to move downwards, such that it appears at the bottom of the fourth application frame 100D. Static object 102, on the other hand, appears at the same position in all of the graphics processing unit (GPU) 2 rendered application frames 100A-D.

As shown in FIG. 10, in the present embodiment, each application frame 100A-D is divided into a set of regularly sized and shaped sub-regions, and a signature (e.g. CRC value) indicating the content of each sub-region that an application frame has been divided into is calculated.

Thus, as shown in FIG. 10, first application frame 100A is divided into a set of sub-regions, and a signature (e.g. CRC) value is determined for each of those sub-regions to provide a set of content-indicating signature values 106A. A set of content-indicating signatures 106B-D is similarly generated for each subsequent application frame 100B-D.

As shown in FIG. 10, one sub-region 105A of the first application frame 100A shows the top of static object 102. In the next application frame 100B, the corresponding sub-region 105B shows the same part of static object 102, since static object 102 is not moving. It will be appreciated, therefore, that in this embodiment, corresponding sub-regions 105A and 105B are the same as each other as they include only static objects, and thus their respective content-indicating signature values should be equal to each other.

Another sub-region 104A is entirely covered by moving object 103 in the first application frame 100A, but in the next application frame 100B, the corresponding sub-region 104B is not entirely covered by moving object 103 anymore because moving object 103 has moved downwards. It will be appreciated, therefore, that in this embodiment, corresponding sub-regions 104A and 104B are different to each other as they include a moving object. Thus, their respective content-indicating signature values should be different to each other.

Accordingly, by comparing a sub-region of a rendered application frame (such as application frame 100B) with a corresponding sub-region of a previously rendered application frame (such as application frame 100A), and then determining whether or not the compared sub-regions are similar (or dissimilar) to each other using the comparison (e.g. by comparing respective signature values for the compared sub-regions), it is possible to determine whether or not these sub-regions include only objects that are not moving (i.e. that are static). If the compared sub-regions are determined be similar to (or the same as) (not dissimilar to) each other, then it is assumed that the compared regions do not include any moving objects that would need to be extrapolated. If the compared sub-regions are not determined not to be similar (e.g. if they are determined to be dissimilar or different) to each other, however, then it is assumed that at least one of the compared sub-regions may include a moving object (or objects).

Thus, in the example illustrated by FIG. 10, to generate an extrapolated ("spacewarped") frame from the second application frame 100B, sub-region 104B may be subjected to an extrapolation operation to generate a corresponding extrapolated region for the extrapolated frame, since sub-region 104B includes moving object 103. Sub-region 105B, however, is not subjected to an extrapolation operation, since it only includes static object 102. Sub-region 105B can thus be directly used in (copied to) the extrapolated frame in place of an extrapolated region, thereby saving processing for that sub-region.

Figure 11:
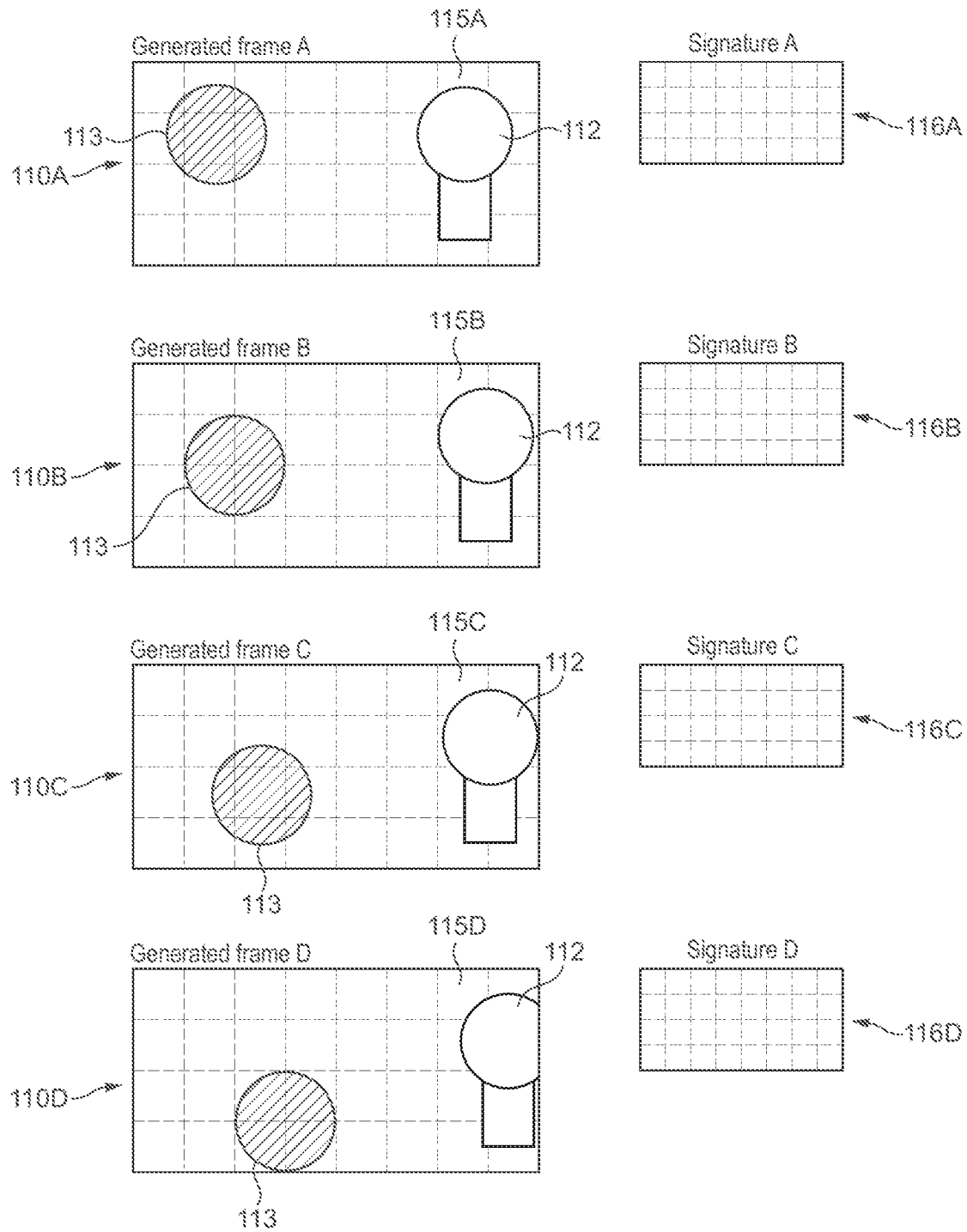
FIG. 11 shows an exemplary series of rendered frames representing successive panning views of an exemplary dynamic scene together with the generation of signature data representing the content of sub-regions of those frames.

FIG. 11 illustrates another example of this operation of the technology described herein. FIG. 11 shows the same scene as shown in FIG. 10, i.e. comprising moving object 113 that is moving downwards with respect to static object 112. However, in contrast with FIG. 10, in FIG. 11 the camera is panning to the left, such that both moving object 113 and static object 112 appear shifted (translated) to the right in second application frame 110B, further shifted to the right in third application frame 110C, and even further shifted to the right in fourth application frame 110D, compared to first application frame 110A.

In the embodiment shown in FIG. 11, as in the embodiment shown in FIG. 10, each application frame 110A-D is divided into a set of regularly sized and shaped sub-regions, and a signature (e.g. CRC value) indicating the content of each sub-region that an application frame has been divided into is calculated, such that a respective set of content-indicating signatures 116A-D is associated with each application frame 110A-D.

In this embodiment, as in the embodiment shown in FIG. 10, one sub-region 115A of the first application frame 110A shows the top of static object 112. Unlike the embodiment shown in FIG. 10, however, in the embodiment shown in FIG. 11, the directly corresponding sub-region 115B in the next application frame 110B shows a different part of static object 112, since static object 112 has shifted to the right with respect to the frame due to the camera panning.

It will be appreciated, therefore, that in this embodiment, directly corresponding sub-regions 115A and 115B (and thus their respective content-indicating signature values) are different to each other even though these regions include only static objects. Thus, in this case, a comparison of (content-indicating signature values for) directly corresponding sub-regions 115A and 115B could lead to the (incorrect) assumption that they include moving objects.

In the present embodiment, therefore, camera panning is taken into account by comparing (content-indicating signatures for) sub-regions that are shifted (translated) with respect to each other based on the camera panning. Thus, for example, rather than comparing sub-region 115B of application frame 110B with sub-region 115A of application frame 110A, sub-region 115B is compared with an appropriately shifted (translated) region of application frame 110A.

Figure 12:
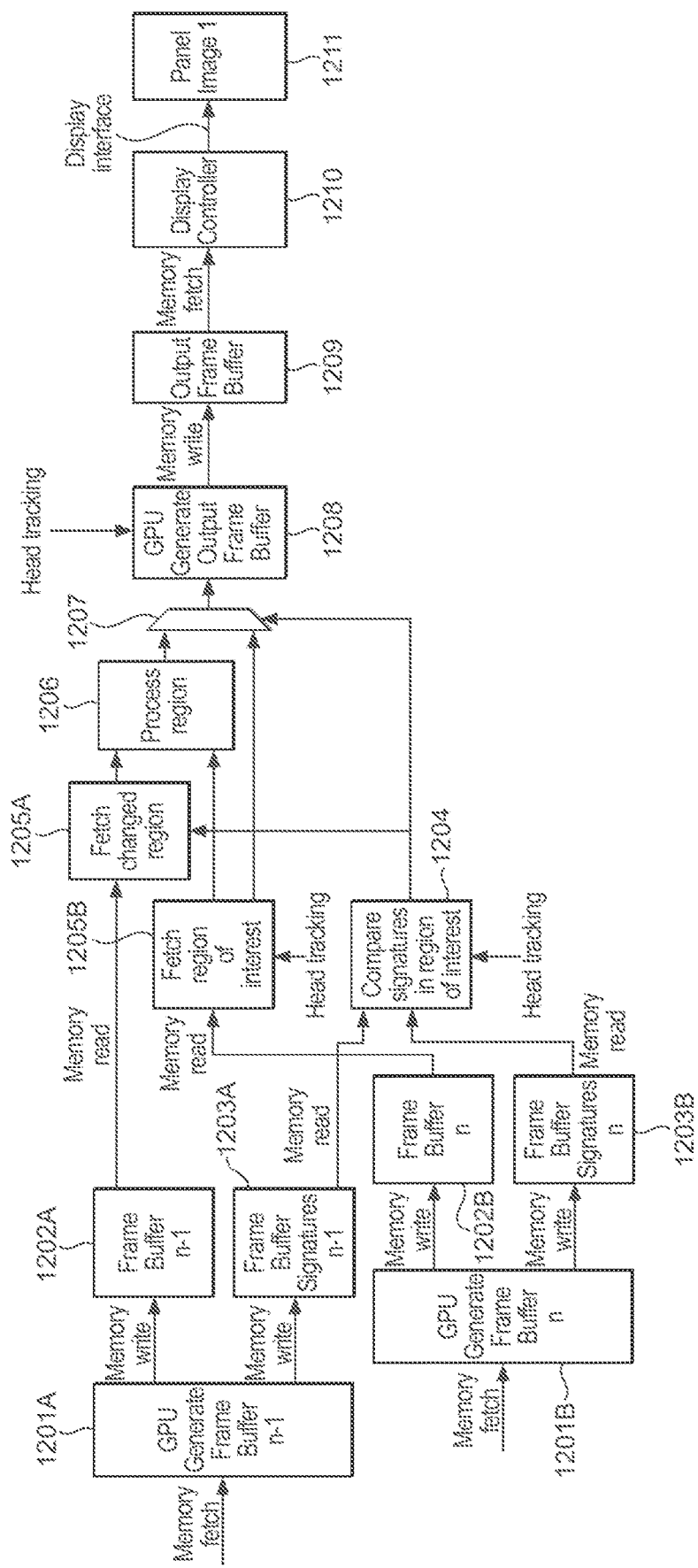
FIG. 12 shows schematically the flow of data and relative timings of processes in a graphics processing system when performing "timewarp" and "spacewarp" processing according to an embodiment of the technology described herein.

FIG. 12 schematically illustrates the flow of data and the relative timings of processes in a graphics processing system, such as is illustrated in FIG. 1, when performing "timewarp" and "spacewarp" processing, in accordance with an embodiment of the technology described herein.

In the present embodiment, graphics processing unit (GPU) 2 renders a series of successive "application" frames. Thus, as shown in FIG. 12, graphics processing unit (GPU) 2 fetches appropriate commands and data (generated by the driver for the GPU 2 executing on the CPU 1) from memory 7, which cause the graphics processing unit (GPU) 2 to first generate (render) a "(n-1)$^{th}$" application frame based on head tracking (orientation) data sensed at the beginning of the graphics processing unit (GPU) 2 rendering the "(n-1)$^{th}$" application frame (block 1201A), and to store the rendered "(n-1)$^{th}$" application frame in a frame buffer in main memory 7 (block 1202A).

After rendering the "(n-1)$^{th}$" application frame, the graphics processing unit (GPU) 2 renders the next, "n$^{th}$" application frame according to commands and data (generated by the driver for the GPU 2 executing on the CPU 1) fetched from memory 7, and based on updated head tracking (orientation) data sensed at the beginning of the graphics processing unit (GPU) 2 rendering the "n$^{th}$" application frame (block 1201B). The rendered "n$^{th}$" application frame is then stored in a frame buffer in main memory 7 (block 1202B).

In the present embodiment, each rendered application frame in the series of application frames is divided into a respective set of regularly sized and shaped sub-regions, and for each one of those sub-regions, a respective signature indicative of the content of the respective sub-region is generated and stored in a buffer in main memory 7, as will be described below with reference to FIGS. 13 and 14. Thus, as shown in FIG. 12, a set of signatures indicative of the content of the set of sub-regions that the "(n-1)$^{th}$" application frame is divided into is generated and stored in a buffer in main memory 7 (block 1203A), and another set of signatures indicative of the content of the set of sub-regions that the "n$^{th}$" application frame is divided into is generated and stored in a buffer in main memory 7 (block 1203B).

Then, before the display 8 is updated based on the newly rendered "n$^{th}$" application frame, further head tracking (orientation) data is sensed and used to determine the sub-regions of the "n$^{th}$" application frame that need to be processed in order to provide an output frame having the desired field of view and representing a view of the scene in an appropriate view direction corresponding to the sensed further head tracking (orientation) data. For each sub-region of the "n$^{th}$" application frame that it is determined needs to be processed, the respective content-indicating signature is then compared in turn with the corresponding content-indicating signature for the "(n−1)$^{th}$" application frame (block 1204).

If a content-indicating signature for the "n$^{th}$" application frame is determined to be similar to (or the same as) (not dissimilar) the corresponding signature for the "(n−1)$^{th}$" application frame, then it is assumed that the corresponding sub-region of the "n$^{th}$" application frame does not include any moving objects that would need to be extrapolated to generate an output extrapolated frame. In this case, the corresponding sub-region of the "n$^{th}$" application frame is fetched from main memory 7 (block 1205B) and may be combined with other output data for other sub-regions in the output extrapolated frame (block 1207).

If a content-indicating signature for the "n$^{th}$" application frame is not determined to be similar (e.g. if it is determined to be dissimilar or different) to the corresponding signature for the "(n−1)$^{th}$" application frame, then it is assumed that the corresponding sub-region of the "n$^{th}$" application frame may include moving objects that need to be extrapolated to generate the extrapolated frame. In this case, the corresponding sub-region of the "n$^{th}$" application frame is fetched from main memory 7 (block 1205B), the corresponding sub-region of the "(n−1)$^{th}$" application frame is fetched from main memory 7 (block 1205A), and the two sub-regions are subjected to "spacewarp" processing (block 1206) to determine whether the corresponding sub-region of the "n$^{th}$" application frame includes moving objects to be extrapolated and to generate an output extrapolated ("spacewarped") region that is combined with other output data for other sub-regions in the output extrapolated frame (block 1207).

Once output data for the entire output extrapolated frame has been generated and combined (at block 1207), the sensed further head tracking (orientation) is used by the graphics processing unit (GPU) 2 to transform the output extrapolated ("spacewarped") frame by "timewarp" processing to generate a first "timewarped" and "spacewarped" version of the "n$^{th}$" application frame (block 1208), which is stored in an output frame buffer in main memory 7 (block 1209). The display controller 4 then reads the first "timewarped" and "spacewarped" version of the "n$^{th}$" application frame stored in the frame buffer (block 1210), and provides it for display on the display panel of the display 8 (block 1211).

The above steps may then be repeated to generate and display one or more (e.g. three more) "timewarped" and "spacewarped" versions of the "n$^{th}$" application frame, while the graphics processing unit (GPU) 2 is rendering a next "(n+1)$^{th}$" application frame.

The entire process may then be repeated one or more times to generate one or more new application frames, and to subject each new application frame to one or more (e.g. four) "timewarp" and "spacewarp" processes so as to display an appropriate sequence of "timewarped" and "spacewarped" frames on the display 8.

As discussed above, in an embodiment, rather than directly comparing frame region data, the comparison process of the technology described herein involves comparing signatures that are indicative of the content of regions to be compared. The generation of such content-indicating signatures according to an embodiment will now be described in more detail.

Figure 13:
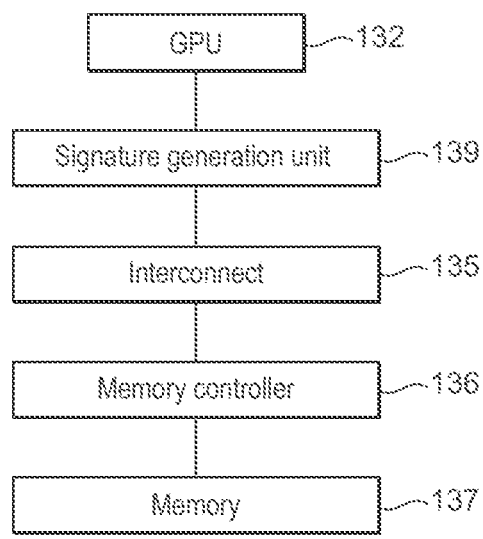
FIG. 13 shows schematically an embodiment in which the technology described herein is used in conjunction with a tile based graphics processor.

FIG. 13 shows schematically an arrangement of a graphics processing system that can be used in embodiments of the technology described herein. The graphics processing system includes, as shown in FIG. 13, a tile based graphics processor or graphics processing unit (GPU) 132, which produces tiles (regions) of a rendered frame as its output.

In such an arrangement, once a tile (region) has been rendered by the graphics processor 132, it would then normally be written to a buffer in memory 137, e.g., via an interconnect 135 which is connected to a memory controller 136. In the present embodiment, this process is modified by the use of a signature generation hardware unit 139. In essence, and as will be discussed in more detail below, the signature generation unit 139 operates to generate for each tile (region) a signature representative of the content of the tile (region).

Figure 14:
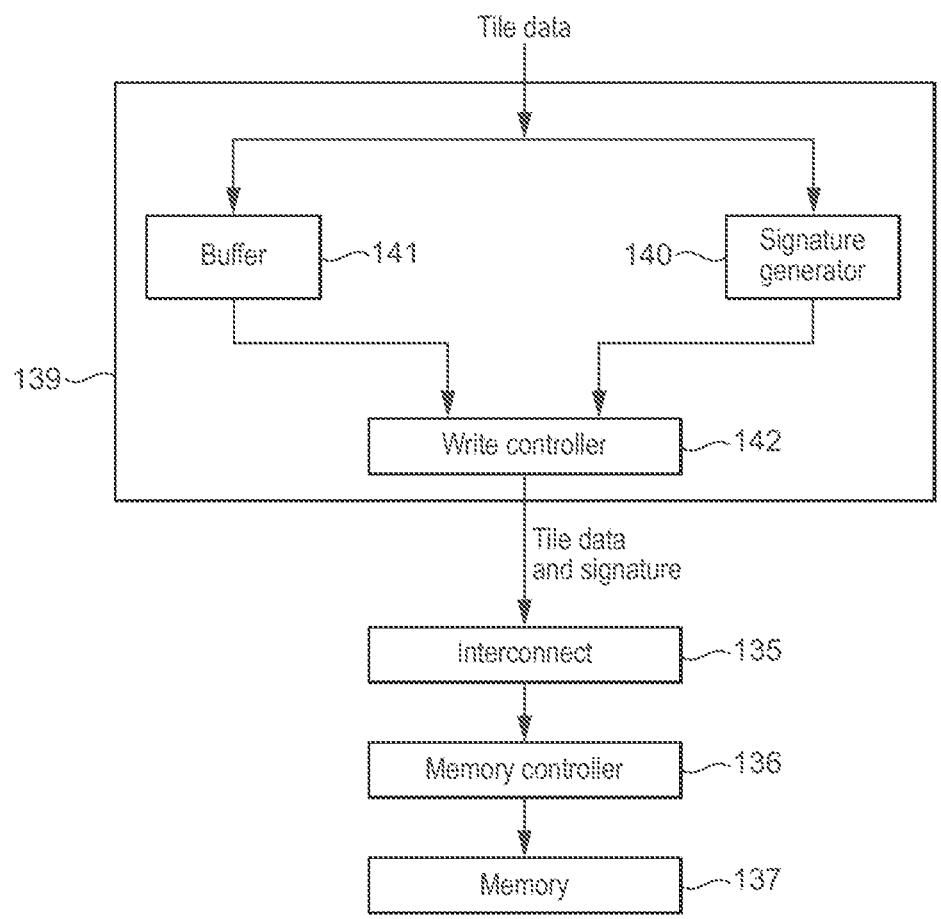
FIG. 14 shows schematically and in more detail the signature generation unit of the embodiment shown in FIG. 13.

FIG. 14 shows the signature generation unit 139 in more detail.

As shown in FIG. 14, tile (region) data is received by the signature generation unit 139 from the graphics processor 132 and is passed both to a buffer 141 which temporarily stores the tile data while the signature generation process takes place, and a signature generator 140.

The signature generator 140 operates to generate the necessary signature for the tile (region). In the present embodiment the signature is in the form of a 32 bit CRC for the tile (region).

Other signature generation functions and other forms of signature such as hash functions, etc., could also or instead be used, if desired. It would also, for example, be possible to generate a single signature for an RGBA tile (region), or a separate signature for each colour plane. Similarly, colour conversion could be performed and a separate signature generated for each of Y, U and V. In order to reduce power consumption, the tile (region) data processed in by the signature generator 140 could be reordered (e.g. using the Hilbert curve), if desired.

Once the signature for the new tile (region) has been generated, it is stored, as discussed above, in a signature buffer that is associated with the rendered frame in question in the memory 137, under the control of a write controller 142.

Figure 15:
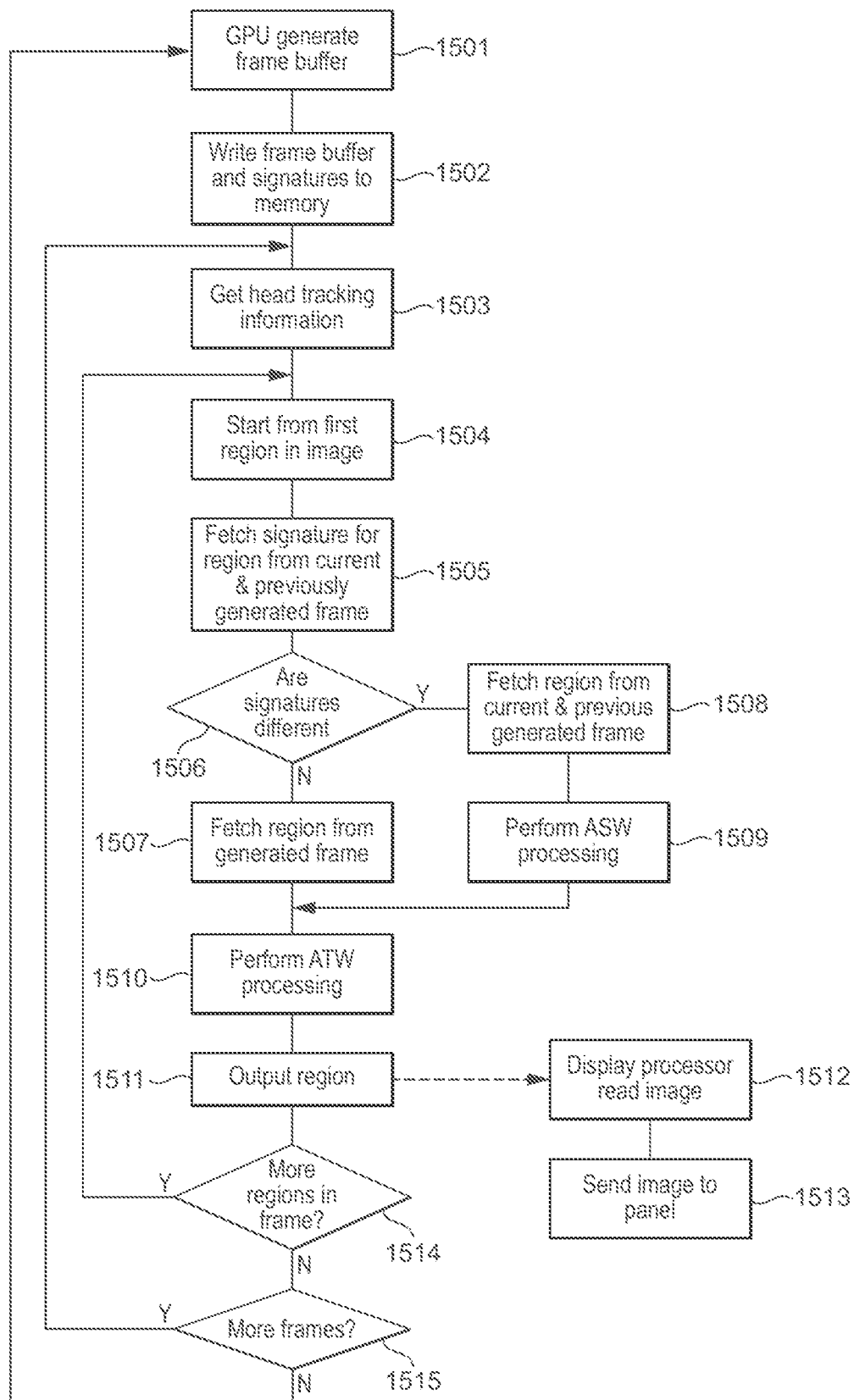
FIG. 15 is a flowchart showing schematically the operation of a graphics processing system according to an embodiment of the technology described herein.

FIG. 15 shows schematically the operation of a graphics processing system, such as is illustrated in FIG. 1, in accordance with an embodiment of the technology described herein. As shown in FIG. 15, in the present embodiment, a graphics processing unit (GPU) 2 of the graphics processing system first renders an application frame based on head tracking (pose) information sensed at the beginning of rendering the application frame (step 1501). A content-indicating signature is calculated for each region of a set of regions that the application frame is divided into. The rendered application frame and the associated set of signatures are written to main memory 7 (step 1502).

Then, further head tracking (pose) information is sensed (step 1503), and used to determine which regions of the rendered application frame should be processed. A first region of the application frame that it is determined should be processed is selected (step 1504), and the corresponding content-indicating signature value is fetched from memory 7, together with a content-indicating signature value for a corresponding region of a previously rendered application frame (step 1505).

The two content-indicating signature values are then compared to each other to determine whether or not they are different to each other (step 1506) (and thus whether or not the corresponding regions of the application frame and the previously rendered application frame are different to each other).

If it is determined that the two content-indicating signature values (and thus the corresponding regions) are different to each other, then the corresponding regions of the application frame and the previously rendered application frame are fetched from main memory 7 (step 1508), before being subjected to asynchronous "spacewarp" ("ASW") processing to generate a corresponding output extrapolated ("spacewarped") region (step 1509). This may involve determining the motion of any moving objects within the frame regions, and then translating, rotating and/or scaling any such moving objects based on their determined motion.

The output extrapolated ("spacewarped") region is then subjected to asynchronous "timewarp" ("ATW") processing (step 1510) based on the further head tracking (pose) information (sensed at step 1503) to generate an output region for display which is stored in main memory 7 (step 1511).

If, on the other hand, it is determined that the two content-indicating signature values (and thus the corresponding regions) are not different to each other (i.e. that they are the same as each other), then only the first region of the application frame may be fetched from main memory 7 (step 1507) (and not the corresponding region of the previously rendered application frame). The fetched first region of the application frame may then be subjected to asynchronous "timewarp" ("ATW") processing (step 1510) based on the further head tracking (pose) information (sensed at step 1503) to generate an output region for display which is stored in main memory 7 (step 1511). As can be seen from FIG. 15, "spacewarp" processing (step 1509) is not performed in respect of this region.

The so-generated output region is then fetched from main memory 7 by the display processor 4 (step 1512), which sends the output region to the display panel of the display 8 (step 1513).

If there are more regions of the application frame to be processed, then steps 1504 to 1513 are repeated in respect of those regions (step 1514). Thus, a next region of the application frame is selected (step 1504), and subjected to "timewarp" processing, or "timewarp" and "spacewarp" processing, depending on a content-indicating signature value comparison. An entire output frame representing a "timewarped" and "spacewarped" version of the application frame is thus generated and provided for display on display 8.

If there are more output frames to be generated from the current application frame, then steps 1503 to 1514 are repeated in respect of those output frames (step 1515). Thus, further head tracking (pose) information is sensed (step 1503), and an output frame representing a "timewarped" and "spacewarped" version of the application frame updated on the basis of the further head tracking (pose) information is generated and displayed on display 8.

The entire process (steps 1501 to 1515) may then be repeated one or more times to generate one or more new application frames, and to generate and display one or more output ("timewarped" and "spacewarped") versions of each application frame.

Although the above embodiments have been described with particular reference to a virtual reality (VR) and/or augmented reality (AR) head mounted display system in which a user's head orientation (pose) is tracked, it will be appreciated that the technology described herein can equally be (and in an embodiment is) applied in the context of a display system that is not head mounted, such as a virtual reality (VR) and/or augmented reality (AR) hand held display system, e.g. a mobile phone or tablet. In such embodiments, the system may operate, for example, to track the movement (orientation) of the display (e.g. of the mobile phone or tablet) itself, and the display orientation data may then be used to determine how images should actually be displayed to the user on the display.

It can be seen from the above, the technology described herein, in embodiments at least, provides an improved graphics processing system that provides "spacewarped" images for display for virtual reality (VR) and/or augmented reality (AR) display systems. This is achieved, in embodiments of the technology described herein at least, by determining whether or not a region of a first (rendered) frame contains one or more objects to be extrapolated to generate an extrapolated ("spacewarped") frame, only when it is determined that the region of the first (rendered) frame is dissimilar to a corresponding region of another (earlier rendered) frame.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing system that renders a sequence of frames each representing a view of a scene of one or more objects, and generates extrapolated frames by extrapolating object motion from rendered frames, the method comprising:
   generating a sequence of frames each representing a view of the same scene, wherein each frame in the sequence of frames represents a view of the scene at a respective point in time and based on a view orientation indicated by view orientation data received by the graphics processing system, and wherein the sequence of frames includes a first frame representing a view of the scene at a first point in time based on a view orientation indicated by first view orientation data received by the graphics processing system, and another frame representing a view of the scene at a second point in time based on a view orientation indicated by second view orientation data received by the graphics processing system;
   generating, for each region of a set of plural regions that the first frame has been divided into, a signature indicative of and derived from the content of the region of the first frame;
   generating, for each region of a set of plural regions that the other frame has been divided into, a signature indicative of and derived from the content of the region of the other frame; and
   generating an extrapolated frame that represents a view of the scene at a third point in time after first and second points in time;
   wherein generating the extrapolated frame comprises:
   for each of at least one region of the set of plural regions that the first frame has been divided into:
   comparing the signature indicative of and derived from the content of the region of the first frame with the signature indicative of and derived from the content of a corresponding region of the other frame;
   determining whether the signature indicative of and derived from the content of the region of the first frame is dissimilar to the signature indicative of and derived from the content of the corresponding region of the other frame using the comparison of the signature indicative of and derived from the content of the region of the first frame with the signature indicative of and derived from the content of the corresponding region of the other frame; and generating a region of the extrapolated frame by:
when it is determined that the signature indicative of and derived from the content of the region of the first frame is dissimilar to the signature indicative of and derived from the content of the corresponding region of the other frame using the comparison of the signature indicative of and derived from the content of the region of the first frame with the signature indicative of and derived from the content of the corresponding region of the other frame:
determining whether the region of the first frame contains one or more objects, the motion of which needs to be extrapolated to generate the extrapolated frame; and
when it is determined that the region of the first frame contains one or more objects, the motion of which needs to be extrapolated to generate the extrapolated frame:
extrapolating the motion of the one or more objects contained within the region of the first frame; and
generating the region of the extrapolated frame using the extrapolation of the motion of the one or more objects contained within the region of the first frame; and
when it is not determined that the signature indicative of and derived from the content of the region of the first frame is dissimilar to the signature indicative of and derived from the content of the corresponding region of the other frame using the comparison of the signature indicative of and derived from the content of the region of the first frame with the signature indicative of and derived from the content of the corresponding region of the other frame:
omitting determining whether the region of the first frame contains one or more objects, the motion of which needs to be extrapolated to generate the extrapolated frame;
omitting extrapolating the motion of any objects contained within the region of the first frame; and
generating the region of the extrapolated frame without using extrapolation of motion of objects contained within the region of the first frame;
the method further comprising:
generating a transformed extrapolated frame representing a view of the scene at the third point in time after the first and second points in time based on a view orientation indicated by third view orientation data received by the graphics processing system by transforming the extrapolated frame based on the view orientation indicated by the third view orientation data received by the graphics processing system; and
displaying the transformed extrapolated frame.

2. The method of claim 1, wherein:
the first frame is a first rendered frame, the other frame is a second, rendered frame that has been rendered earlier in a sequence of rendered frames that the first rendered frame and the other frame are part of, and the extrapolated frame represents an extrapolated version of the first rendered frame; or the first frame is a first processed version of a rendered frame, and the other frame is a second processed version of a rendered frame.

3. The method of claim 1, wherein the regions that the first frame is divided into comprise tiles of a set of processing tiles that the graphics processing system generates as its output.

4. The method of claim 1, wherein the region of the other frame that is compared with the region of the first frame is a region of the other frame that is at least one of: displaced, rotated and scaled within the frame relative to the region of the first frame.

5. The method of claim 1, wherein the at least one region of the set of regions that the first frame has been divided into comprises a subset of the set of regions that the first frame has been divided into that is selected based on received view orientation data.

6. The method of claim 1, comprising generating the extrapolated frame by extrapolating the motion of only objects contained within a region of the first frame that has been determined to contain one or more objects, the motion of which needs to be extrapolated to generate the extrapolated frame.

7. The method of claim 1, wherein the extrapolated frame comprises both regions that have been extrapolated from a rendered frame region, and regions that have not been extrapolated from a rendered frame region.

8. The method of claim 1, wherein the set of plural regions that the first frame is divided into comprises an array of regularly sized and shaped regions of the first frame, and wherein the set of plural regions that the other frame is divided into comprises an array of regularly sized and shaped regions of the other frame.

9. A graphics processing system comprising:
processing circuitry configured to render a sequence of frames each representing a view of a scene of one or more objects, and generate extrapolated frames by extrapolating object motion from rendered frames;
wherein the processing circuitry is configured to:
generate a sequence of frames each representing a view of the same scene, wherein each frame in the sequence of frames represents a view of the scene at a respective point in time and based on a view orientation indicated by view orientation data received by the graphics processing system, and wherein the sequence of frames includes a first frame representing a view of the scene at a first point in time based on a view orientation indicated by first view orientation data received by the graphics processing system, and another frame representing a view of the scene at a second point in time based on a view orientation indicated by second view orientation data received by the graphics processing system;
generate, for each region of a set of plural regions that the first frame has been divided into, a signature indicative of and derived from the content of the region of the first frame;
generate, for each region of a set of plural regions that the other frame has been divided into, a signature indicative of and derived from the content of the region of the other frame; and
generate an extrapolated frame that represents a view of the scene at a third point in time after first and second points in time by:
for each of at least one region of the set of plural regions that the first frame has been divided into:

comparing the signature indicative of and derived from the content of the region of the first frame with the signature indicative of and derived from the content of a corresponding region of the other frame;

determining whether the signature indicative of and derived from the content of the region of the first frame is dissimilar to the signature indicative of and derived from the content of the corresponding region of the other frame using the comparison of the signature indicative of and derived from the content of the region of the first frame with the signature indicative of and derived from the content of the corresponding region of the other frame; and generating a region of the extrapolated frame by:
when it is determined that the signature indicative of and derived from the content of the region of the first frame is dissimilar to the signature indicative of and derived from the content of the corresponding region of the other frame using the comparison of the signature indicative of and derived from the content of the region of the first frame with the signature indicative of and derived from the content of the corresponding region of the other frame:
determining whether the region of the first frame contains one or more objects, the motion of which needs to be extrapolated to generate the extrapolated frame; and
when it is determined that the region of the first frame contains one or more objects, the motion of which needs to be extrapolated to generate the extrapolated frame:
extrapolating the motion of the one or more objects contained within the region of the first frame; and
generating the region of the extrapolated frame using the extrapolation of the motion of the one or more objects contained within the region of the first frame; and
when it is not determined that the signature indicative of and derived from the content of the region of the first frame is dissimilar to the signature indicative of and derived from the content of the corresponding region of the other frame using the comparison of the signature indicative of and derived from the content of the region of the first frame with the signature indicative of and derived from the content of the corresponding region of the other frame:
omitting determining whether the region of the first frame contains one or more objects, the motion of which needs to be extrapolated to generate the extrapolated frame;
omitting extrapolating the motion of any objects contained within the region of the first frame; and
generating the region of the extrapolated frame without using extrapolation of motion of objects contained within the region of the first frame;

wherein the processing circuitry is further configured to:
generate a transformed extrapolated frame representing a view of the scene at the third point in time after the first and second points in time based on a view orientation indicated by third view orientation data received by the graphics processing system by transforming the extrapolated frame based on the view orientation indicated by the third view orientation data received by the graphics processing system; and
cause the transformed extrapolated frame to be displayed.

10. The system of claim 9, wherein the first frame is a first rendered frame, the other frame is a second, rendered frame that has been rendered earlier in a sequence of rendered frames that the first frame and the other frame are part of, and the extrapolated frame represents an extrapolated version of the first rendered frame; or
the first frame is a first processed version of a rendered frame, and the other frame is a second processed version of a rendered frame.

11. The system of claim 9, wherein the regions that the first frame is divided into comprise tiles of a set of processing tiles that the graphics processing system generates as its output.

12. The system of claim 9, wherein the region of the other frame that is compared with the region of the first frame is a region of the other frame that is at least one of: displaced, rotated and scaled within the frame relative to the region of the first frame.

13. The system of claim 9, wherein the at least one region of the set of regions that the first frame has been divided into comprises a subset of the set of regions that the first frame has been divided into that is selected based on received view orientation data.

14. The system of claim 9, wherein the extrapolated frame is generated by extrapolating the motion of only objects contained within a region of the first frame that has been determined to contain one or more objects, the motion of which needs to be extrapolated to generate the extrapolated frame.

15. The system of claim 9, wherein the extrapolated frame comprises both regions that have been extrapolated from a rendered frame region, and regions that have not been extrapolated from a rendered frame region.

16. The system of claim 9, wherein the set of plural regions that the first frame is divided into comprises an array of regularly sized and shaped regions of the first frame, and wherein the set of plural regions that the other frame is divided into comprises an array of regularly sized and shaped regions of the other frame.

17. A display system comprising:
a display;
orientation sensing circuitry operable to sense a head orientation of a user of the display system or a display orientation of the display and to provide view orientation data indicative of a sensed head or display orientation; and
a graphics processing system comprising:
processing circuitry configured to render a sequence of frames each representing a view of a scene of one or more objects, and generate extrapolated frames by extrapolating object motion from rendered frames;
wherein the processing circuitry is configured to:
generate a sequence of frames each representing a view of the same scene, wherein each frame in the sequence of frames represents a view of the scene at a respective point in time and based on a view orientation indicated by view orientation data provided by the orientation sensing circuitry, and wherein the sequence of frames includes a first frame representing a view of the scene at a first point in time based on a view orientation indicated by first view orientation data provided by the orientation sensing circuitry, and another frame representing a view of the scene at a second point in time based on a view orientation indicated by second view orientation data provided by the orientation sensing circuitry;

generate, for each region of a set of plural regions that the first frame has been divided into, a signature indicative of and derived from the content of the region of the first frame;

generate, for each region of a set of plural regions that the other frame has been divided into, a signature indicative of and derived from the content of the region of the other frame; and generate an extrapolated frame that represents a view of the scene at a third point in time after first and second points in time by:

for each of at least one region of the set of plural regions that the first frame has been divided into:

comparing the signature indicative of and derived from the content of the region of the first frame with the signature indicative of and derived from the content of a corresponding region of the other frame;

determining whether the signature indicative of and derived from the content of the region of the first frame is dissimilar to the signature indicative of and derived from the content of the corresponding region of the other frame using the comparison of the signature indicative of and derived from the content of the region of the first frame with the signature indicative of and derived from the content of the corresponding region of the other frame; and generating a region of the extrapolated frame by:

when it is determined that the signature indicative of and derived from the content of the region of the first frame is dissimilar to the signature indicative of and derived from the content of the corresponding region of the other frame using the comparison of the signature indicative of and derived from the content of the region of the first frame with the signature indicative of and derived from the content of the corresponding region of the other frame:

determining whether the region of the first frame contains one or more objects, the motion of which needs to be extrapolated to generate the extrapolated frame; and when it is determined that the region of the first frame contains one or more objects, the motion of which needs to be extrapolated to generate the extrapolated frame:

extrapolating the motion of the one or more objects contained within the region of the first frame; and generating the region of the extrapolated frame using the extrapolation of the motion of the one or more objects contained within the region of the first frame; and when it is not determined that the signature indicative of and derived from the content of the region of the first frame is dissimilar to the signature indicative of and derived from the content of the corresponding region of the other frame using the comparison of the signature indicative of and derived from the content of the region of the first frame with the signature indicative of and derived from the content of the corresponding region of the other frame:

omitting determining whether the region of the first frame contains one or more objects, the motion of which needs to be extrapolated to generate the extrapolated frame;

omitting extrapolating the motion of any objects contained within the region of the first frame; and generating the region of the extrapolated frame without using extrapolation of motion of objects contained within the region of the first frame;

wherein the processing circuitry is further configured to:

generate a transformed extrapolated frame representing a view of the scene at the third point in time after the first and second points in time based on a view orientation indicated by third view orientation data provided by the orientation sensing circuitry by transforming the extrapolated frame based on the view orientation indicated by the third view orientation data provided by the orientation sensing circuitry; and cause the transformed extrapolated frame to be displayed on the display.

18. A non-transitory computer readable storage medium storing software code which when executing on a processor performs a method of operating a graphics processing system that renders a sequence of frames each representing a view of a scene of one or more objects, and generates extrapolated frames by extrapolating object motion from rendered frames, the method comprising:

generating a sequence of frames each representing a view of the same scene, wherein each frame in the sequence of frames represents a view of the scene at a respective point in time and based on a view orientation indicated by view orientation data received by the graphics processing system, and wherein the sequence of frames includes a first frame representing a view of the scene at a first point in time based on a view orientation indicated by first view orientation data received by the graphics processing system, and another frame representing a view of the scene at a second point in time based on a view orientation indicated by second view orientation data received by the graphics processing system;

generating, for each region of a set of plural regions that the first frame has been divided into, a signature indicative of and derived from the content of the region of the first frame;

generating, for each region of a set of plural regions that the other frame has been divided into, a signature indicative of and derived from the content of the region of the other frame; and generating an extrapolated frame that represents a view of the scene at a third point in time after first and second points in time;

wherein generating the extrapolated frame comprises:

for each of at least one region of the set of plural regions that the first frame has been divided into:

comparing the signature indicative of and derived from the content of the region of the first frame with the signature indicative of and derived from the content of the corresponding region of the other frame;

determining whether the signature indicative of and derived from the content of the region of the first frame is dissimilar to the signature indicative of and derived from the content of the corresponding region of the other frame using the comparison of the signature indicative of and derived from the content of the region of the first frame with the signature indicative of and derived from the content of the corresponding region of the other frame; and generating a region of the extrapolated frame by:
when it is determined that the signature indicative of and derived from the content of the region of the first frame is dissimilar to the signature indicative of and derived from the content of the corresponding region of the other frame using the comparison of the signature indicative of and derived from the content of the region of the first frame with the signature indicative of and derived from the content of the corresponding region of the other frame:
determining whether the region of the first frame contains one or more objects, the motion of which needs to be extrapolated to generate the extrapolated frame; and
when it is determined that the region of the first frame contains one or more objects, the motion of which needs to be extrapolated to generate the extrapolated frame:
extrapolating the motion of the one or more objects contained within the region of the first frame; and
generating the region of the extrapolated frame using the extrapolation of the motion of the one or more objects contained within the region of the first frame; and when it is not determined that the signature indicative of and derived from the content of the region of the first frame is dissimilar to the signature indicative of and derived from the content of the corresponding region of the other frame using the comparison of the signature indicative of and derived from the content of the region of the first frame with the signature indicative of and derived from the content of the corresponding region of the other frame:
omitting determining whether the region of the first frame contains one or more objects, the motion of which needs to be extrapolated to generate the extrapolated frame;
omitting extrapolating the motion of any objects contained within the region of the first frame; and
generating the region of the extrapolated frame without using extrapolation of motion of objects contained within the region of the first frame;

the method further comprising:
generating a transformed extrapolated frame representing a view of the scene at the third point in time after the first and second points in time based on a view orientation indicated by third view orientation data received by the graphics processing system by transforming the extrapolated frame based on the view orientation indicated by the third view orientation data received by the graphics processing system; and
displaying the transformed extrapolated frame.

\* \* \* \* \*